United States Patent
Edge et al.

(10) Patent No.: US 10,572,128 B2
(45) Date of Patent: Feb. 25, 2020

(54) MEDIA PRESENTATION EFFECTS

(71) Applicant: Microsoft Technology Licensing, LLC, Redmond, WA (US)

(72) Inventors: Darren Keith Edge, Beijing (CN); Koji Yatani, Beijing (CN); Genki Furumi, Kanagawa (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 645 days.

(21) Appl. No.: 14/464,607

(22) Filed: Aug. 20, 2014

(65) Prior Publication Data
US 2015/0095785 A1  Apr. 2, 2015

Related U.S. Application Data

(63) Continuation of application No. PCT/CN2013/084565, filed on Sep. 29, 2013.

(51) Int. Cl.
| | |
|---|---|
| G06F 3/0484 | (2013.01) |
| G06F 3/0481 | (2013.01) |
| G11B 27/034 | (2006.01) |
| G06F 3/0482 | (2013.01) |
| G06F 17/21 | (2006.01) |

(52) U.S. Cl.
CPC ........ *G06F 3/04847* (2013.01); *G06F 3/0481* (2013.01); *G06F 3/0482* (2013.01); *G06F 3/04842* (2013.01); *G06F 17/212* (2013.01); *G11B 27/034* (2013.01)

(58) Field of Classification Search
CPC ............. G06F 17/30056; G06F 3/0481; G06F 3/0482; G06F 3/04847; G06F 3/04842; G06F 17/212; G11B 27/034
See application file for complete search history.

(56) References Cited

U.S. PATENT DOCUMENTS

| | | | |
|---|---|---|---|
| 5,574,798 A | 11/1996 | Greer et al. | |
| 6,084,582 A | 7/2000 | Qureshi et al. | |
| 6,396,500 B1 * | 5/2002 | Qureshi | G06F 17/30905 345/418 |

(Continued)

FOREIGN PATENT DOCUMENTS

| | | |
|---|---|---|
| CN | 102081946 A | 6/2011 |
| CN | 102169483 A | 8/2011 |

(Continued)

OTHER PUBLICATIONS

Batts, "A Beamer Tutorial in Beamer", Department of Computer Science, The University of North Carolina at Greensboro, Apr. 2007, 55 pages.

(Continued)

*Primary Examiner* — Tuyetlien T Tran

(57) ABSTRACT

A user interface may present multiple presentation slides for user selection. Each slide may include one or more shapes, and a shape thread may be associated with each shape on the slide. For a selected slide, the user interface may present one or more shape threads associated with the selected slide. Each shape displayed on the selected slide may be associated with a particular shape thread, and a user may independently adjust one or more slide transition attributes of a shape via the associated shape thread.

20 Claims, 32 Drawing Sheets

(56) References Cited

U.S. PATENT DOCUMENTS

| | | | |
|---|---|---|---|
| 6,453,302 B1 | 9/2002 | Johnson et al. | |
| 6,580,438 B1 | 6/2003 | Ichimura et al. | |
| 6,774,920 B1 | 8/2004 | Cragun | |
| 6,826,729 B1* | 11/2004 | Giesen | G06F 3/0481 715/808 |
| 7,299,418 B2 | 11/2007 | Dieberger | |
| 7,342,586 B2 | 3/2008 | Jaeger | |
| 7,383,509 B2 | 6/2008 | Foote et al. | |
| 7,428,704 B2 | 9/2008 | Baker et al. | |
| 7,549,120 B1 | 6/2009 | Griffith et al. | |
| 7,714,802 B2 | 5/2010 | Hurley et al. | |
| 7,870,503 B1 | 1/2011 | Levy | |
| 7,996,436 B2 | 8/2011 | Schneider et al. | |
| 8,166,402 B2 | 4/2012 | Collins et al. | |
| 8,269,790 B2 | 9/2012 | Wong et al. | |
| 9,043,722 B1 | 5/2015 | Holt | |
| 9,093,007 B2 | 7/2015 | Berglund | |
| 2001/0020953 A1* | 9/2001 | Moriwake | G11B 27/034 715/723 |
| 2001/0021938 A1 | 9/2001 | Fein | |
| 2002/0069218 A1 | 6/2002 | Sull et al. | |
| 2002/0147740 A1* | 10/2002 | Faraday | G06F 3/0481 715/202 |
| 2002/0194230 A1 | 12/2002 | Polanyi | |
| 2003/0090506 A1* | 5/2003 | Moore | G06T 13/80 715/730 |
| 2003/0122863 A1 | 7/2003 | Dieberger et al. | |
| 2003/0202007 A1 | 10/2003 | Silverstein et al. | |
| 2004/0239679 A1* | 12/2004 | Ito | G06T 15/00 345/555 |
| 2004/0267387 A1 | 12/2004 | Samadani | |
| 2005/0066059 A1 | 3/2005 | Zybura et al. | |
| 2005/0081154 A1 | 4/2005 | Vogel | |
| 2005/0108619 A1 | 5/2005 | Theall et al. | |
| 2005/0193323 A1 | 9/2005 | Coulomb et al. | |
| 2005/0246313 A1 | 11/2005 | Turski et al. | |
| 2006/0036568 A1 | 2/2006 | Moore | |
| 2006/0200759 A1 | 9/2006 | Agrawala et al. | |
| 2007/0055926 A1 | 3/2007 | Christiansen et al. | |
| 2007/0055939 A1 | 3/2007 | Furlong et al. | |
| 2007/0058207 A1* | 3/2007 | Asai | G06F 17/30056 358/296 |
| 2007/0101299 A1* | 5/2007 | Shaw | G06F 3/0482 715/853 |
| 2007/0118506 A1 | 5/2007 | Kao et al. | |
| 2007/0133034 A1 | 6/2007 | Jindal et al. | |
| 2007/0171201 A1 | 7/2007 | Pi | |
| 2007/0186167 A1 | 8/2007 | Anderson | |
| 2007/0186168 A1* | 8/2007 | Waldman | G06F 17/214 715/732 |
| 2007/0226625 A1* | 9/2007 | Cardone | G06Q 90/00 715/732 |
| 2007/0266325 A1* | 11/2007 | Helm | G06Q 10/10 715/733 |
| 2008/0028314 A1* | 1/2008 | Bono | G11B 27/034 715/732 |
| 2008/0034345 A1 | 2/2008 | Curtis et al. | |
| 2008/0040340 A1 | 2/2008 | Varadarajan et al. | |
| 2008/0046803 A1* | 2/2008 | Beauchamp | G06F 17/30563 715/212 |
| 2008/0178089 A1 | 7/2008 | Baker et al. | |
| 2009/0044117 A1* | 2/2009 | Vaughan | G11B 27/034 715/716 |
| 2009/0100369 A1 | 4/2009 | Mindrum | |
| 2009/0119597 A1* | 5/2009 | Vaughan | G06F 3/048 715/732 |
| 2009/0172548 A1 | 7/2009 | Screen | |
| 2009/0172549 A1* | 7/2009 | Davidson | G06F 3/0481 715/732 |
| 2009/0172559 A1 | 7/2009 | Waldman | |
| 2009/0216794 A1 | 8/2009 | Saptharishi | |
| 2009/0262116 A1* | 10/2009 | Zhao | G06T 13/00 345/473 |
| 2009/0292986 A1 | 11/2009 | Anderson | |
| 2009/0309881 A1* | 12/2009 | Zhao | G06T 13/00 345/473 |
| 2010/0031152 A1 | 2/2010 | Villaron | |
| 2010/0064223 A1* | 3/2010 | Tilton | G06T 13/80 715/732 |
| 2010/0088605 A1 | 4/2010 | Livshin et al. | |
| 2010/0118037 A1* | 5/2010 | Sheikh | G06T 13/80 345/473 |
| 2010/0146393 A1 | 6/2010 | Land et al. | |
| 2010/0169784 A1* | 7/2010 | Weber | G11B 27/034 715/731 |
| 2010/0199180 A1 | 8/2010 | Brichter | |
| 2010/0207950 A1* | 8/2010 | Zhao | G06T 13/00 345/473 |
| 2010/0218100 A1 | 8/2010 | Simon | |
| 2010/0238176 A1* | 9/2010 | Guo | G06T 11/206 345/440 |
| 2010/0281367 A1* | 11/2010 | Langmacher | G06F 3/04847 715/716 |
| 2010/0293470 A1* | 11/2010 | Zhao | G06F 3/04847 715/732 |
| 2010/0309436 A1 | 12/2010 | Allen, Jr. et al. | |
| 2011/0004563 A1 | 1/2011 | Rauber | |
| 2011/0040804 A1 | 2/2011 | Peirce et al. | |
| 2011/0181521 A1* | 7/2011 | Reid | G06F 3/0483 345/173 |
| 2011/0181602 A1* | 7/2011 | Boda | G06F 9/4443 345/473 |
| 2011/0191672 A1 | 8/2011 | Schodl et al. | |
| 2011/0271179 A1 | 11/2011 | Jasko et al. | |
| 2011/0295392 A1 | 12/2011 | Cunnington | |
| 2011/0302494 A1* | 12/2011 | Callery | G06F 17/30056 715/732 |
| 2012/0221975 A1 | 8/2012 | Juristovski et al. | |
| 2013/0024772 A1 | 1/2013 | Delia et al. | |
| 2013/0050255 A1 | 2/2013 | Sprang et al. | |
| 2013/0097552 A1* | 4/2013 | Villaron | G06T 13/80 715/781 |
| 2013/0111373 A1 | 5/2013 | Kawanishi et al. | |
| 2013/0120400 A1* | 5/2013 | Maloney | G06T 13/00 345/473 |
| 2013/0120403 A1 | 5/2013 | Maloney et al. | |
| 2013/0288722 A1 | 10/2013 | Ramanujam et al. | |
| 2014/0096006 A1* | 4/2014 | Berglund | G06T 13/80 715/732 |
| 2014/0165087 A1 | 6/2014 | Smith et al. | |
| 2014/0317488 A1 | 10/2014 | Lutz | |
| 2014/0344702 A1 | 11/2014 | Edge et al. | |
| 2015/0007005 A1 | 1/2015 | Edge et al. | |
| 2015/0033116 A1 | 1/2015 | McKinney et al. | |
| 2015/0113372 A1* | 4/2015 | Flider | G06F 17/2211 715/204 |
| 2015/0132735 A1 | 5/2015 | Edge et al. | |
| 2015/0178287 A1 | 6/2015 | Kim | |
| 2016/0196681 A1* | 7/2016 | Tilton | G06T 13/80 715/732 |

FOREIGN PATENT DOCUMENTS

| | | |
|---|---|---|
| CN | 102903128 | 1/2013 |
| CN | 103279259 A | 9/2013 |
| EP | 1696337 | 8/2006 |
| JP | 2004184576 A | 7/2004 |
| WO | WO2000026828 | 5/2000 |
| WO | WO0145018 | 6/2001 |
| WO | WO2007069557 A1 | 6/2007 |
| WO | WO2010151257 | 12/2010 |

OTHER PUBLICATIONS

Batts, "A Beamer Tutorial in Beamer," Department of Computer Science, The University of North Caroline at Greensboro, Apr. 2007, 55 pages.

(56) References Cited

OTHER PUBLICATIONS

The European Office Action dated Apr. 4, 2016 for European patent application No. 14730712.8, a counterpart foreign application of U.S. Appl. No. 13/898,338, 5 pages.
The Supplementary European Search Report dated Mar. 15, 2016 for European patent application No. 14730712.8, 4 pages.
Indezine.com, retrieved on Feb. 5, 2012 at <<http://www.indezine.com/products/powerpoi nt/learn/picturesandvisuals/apply-theme-to-photo-album-ppt2010.html>> pp. 1-3.
PCT International Preliminary Report on Patentability for Application No. PCT/US2014/064714, dated Feb. 15, 2016 (8 pages).
Office action for U.S. Appl. No. 13/898,338, dated Apr. 15, 2016, Edge et al., "Adaptive Timing Support for Presentations", 17 pages.
Slidy—a web based alternative to Microsoft PowerPoint, May 14, 2006, <<http://www.w3.org/2006/05/Slidy-XTech/slidy-xtech06-dsr.pdf>> pp. 1-14.
Tex Sound, embedding sound files into beamer presentation with media9, retrieved on Apr. 12, 2012 at <<http://tex.stackexchange.com/questions/51632/embedding-soundfiles-into-beamer-presentation-with-media9>22 pp. 1-3.
Bajaj,"Apply Theme to Photo Album Presnetations win PowerPoint 2010", Retrieved from <<http://www.indezine.cpm/products/powerpoint/learn/picturesandvisuals/apply-theme-to-photo-album-ppt2010.html>>, Feb. 2012, 3 pages.
Batts, "A Beamer Tutorial in Beamer", Department of Computer Science, The University of North Carolina at Greensboro, Apr. 2007, 110 pages.
Career Track, "QuickClicks Reference Guide to Microsoft PowerPoint 2010", Published by Career Track, a Division of PARK University Enterprises, Inc., 2011, 4 pages.
LaTeX, "Beamer linking within document", LaTeX Community Forum, Retreived from <<http://www.latex-community.org/forum/viewtopic.php?f=4&t=4594>>, Apr. 2009, 5 pages.
Office action for U.S. Appl. No. 13/933,030, dated Jan. 4, 2016, Edge et al., "Dynamic Presentation Prototyping and Generation", 18 pages.
Office action for U.S. Appl. No. 14/077,674, dated Feb. 1, 2016, Edge et al., "Presentation Rehearsal", 33 pages.
Raggett, "Slidy—A Web based alternative to Microsoft PowerPoint", XTech 2006, May 2006, 13 pages.
Tex, "Background image in beamer slides", Retrieved from <<http://tex.stackexchange.com/questions/78464/background-image-in-beamer-slides>>, Oct. 2012, 6 pages.
TeX, "Embedding sound files into beamer presentation with media9", Retreived from <<http://tex.stackexchange.com/questions/51632/embedding-sound-files-into-beamer-presnetation-with-media9>>, Apr. 2012, 3 pages.
The European Office Action dated Dec. 18, 2015 for European patent application No. 13876698.5, a counterpart foreign application of U.S. Appl. No. 13/933,030, 6 pages.
The Supplementary European Search Report dated Oct. 28, 2015 for European patent application No. 13876698.5, 2 pages.
Office action for U.S. Appl. No. 13/898,338, dated Dec. 15, 2015, Edge et al., "Adaptive Timing Support for Presentations", 16 pages.
"PowerPoint2010: Applying Transitions", Retrieved from <<http://www.gcflearnfree.org/powerpoing2010/6.4>>, Available as early as Jan. 2011, 1 page.
Raggett, et al., "HTML 4.01 Specification", Internet Citation, Dec. 24, 1999, retrieved from the internet on May 3, 2011 at URL:http://www.w3.org/TR/html401.
Wikipedia Digital Dictation, retrieved on Jul. 29, 2015 at <<https://en.wikipedia.org/w/index.php?title=Digital_dictation&oldid=Presentation program&oldid=546255522>>, Wikipedia, 3 pgs.
Office action for U.S. Appl. No. 13/898,338 dated Aug. 19, 2015, Edge et al., "Adaptive Timing Support for Presentations", 17 pages.
The PCT Written Opinion of the IPEA dated Aug. 4, 2015 for PCT application No. PCT/US2014/064714, 9 pages.
Chinese Office Action dated Mar. 14, 2017 for Chinese patent application No. 201380074201.X, a counterpart foreign application of U.S. Appl. No. 13/933,030.
The Extended European Search Report dated Mar. 30, 2017 for European patent application No. 13888284.0, 8 pages.

U.S. Appl. No. 13/898,338, Darren Edge et al., "Adaptive Timing Support for Presentations," May 20, 2013, 55 pages.
U.S. Appl. No. 13/933,030, Darren Edge et al., "Dynamic Presentation Prototyping and Generation," filed Jul. 1, 2013, 45 pages.
U.S. Appl. No. 14/077,674, Darren Edge et al., "Presentation Rehearsal," filed Nov. 12, 2013, 52 pages.
"Apple Keynote," retrieved on Feb. 2, 2013 at <<http://www.apple.com/iwork/keynote/>>, Apple Inc., 2013, 4 page.
Beck et al., "Principles behind the Agile Manifesto," retrieved on Feb. 2, 2013 at <<http://agilemanifesto.org/principles.html>>, 2001, 2 pages.
Bederson et al., "Pad++: Advances in Multiscale Interfaces," retrieved on Feb. 9, 2013 at <<http://wiki.lri.fr/fondihm/_files/pad-chi94-bederson.pdf>>, ACM, Proceedings of Conference Companion on Human Factors in Computing Systems, Apr. 24, 1994, p. 315-316.
Bohon, "How to Create a Presentation with Markdown," retrieved on Mar. 5, 2013 at <<http://www.maclife.com/article/howtos/how_create_presentation_markdown>>, Mac/Life, May 2, 2012, 5 pages.
Carnegie, "The Quick and Easy Way to Effective Speaking: Modern Techniques for Dynamic Communication," Pocket Books, copyright 1962, 112 pages.
Carpenter et al., "What types of learning are enhanced by a cued recall test?" retrieved on Feb. 9, 2012 at <<http://www.edvul.com/pdf/CarpenterPashlerVul-PBR-2006.pdf>>, Psychonomic Bulletin and Review, vol. 13, No. 5, 2006, pp. 826-830.
Charmaz, "Constructing Grounded Theory: A Practical Guide through Qualitative Analysis. Sage," Sage Publications, 2006, 219 pages.
"Create a PowerPoint presentation from a plain text file," retrieved on Mar. 5, 2013 at <<http://www.ppffaq.com/FAQ00246_Create_a_PowerPoint_presentation_from_a_plain_text_file.htm>>, PPTools, 2 pages.
Duarte, "Resonate: Present Visual Stories that Transform Audiences," Wiley, 2010, 251 pages.
Duarte, "Slide:ology: The Art and Science of Creating Great Presentations," O'Reilly Media, 2010, 240 pages.
Edge et al., "MicroMandarin: Mobile Language Learning in Context," retrieved on Feb. 9, 2013 at <<http://voxy.com/blog/wp-content/uploads/2011/03/micromandarin.pdf>>, Proceedings of Conference on Human Factors in Computing Systems (CHI), May 7, 2011, pp. 3169-3178.
Fourney et al., "Gesturing in the Wild: Understanding the Effects and Implications of Gesture-Based Interaction for Dynamic Presentations," retrieved on Feb. 9, 2013 at <<http://www.adamfourney.com/papers/fourney_terry_mann_bhci2010.pdf>>, Proceedings of British Computer Society (BCS) Interaction Specialist Group Conference, Sep. 6, 2010, pp. 230-240.
Gallo, "The Presentation Secrets of Steve Jobs: How to be Insanely Great in Front of Any Audience," McGraw Hill, 2010, 128 pages.
Good et al., "Zoomable user interfaces as a medium for slide show presentations," retrieved on Feb. 9, 2013 at <<http://citeseerx.ist.psu.edu/viewdoc/download?doi=10.1.1.101.2931&rep=rep1&type=pdf>>, Journal of Information Visualization, vol. 1, No. 1, Mar. 2002, pp. 35-49.
"Google Docs Presentations," retrieved on Feb. 13, 2013 at <<http://www.google.com/drive/start/apps.html#product=slides>>, Google Drive, 3 pages.
Gouli et al., "An Adaptive Feedback Framework to Support Reflection, Guiding and Tutoring," Advances in Web-Based Education: Personalized Learning Environments, Oct. 2005, 19 pages.
"Haiku Deck," retrieved on Feb. 13, 2013 at <<http://www.haikudeck.com/>>, Giant Thinkwell Inc., 2012, 2 pages.
"Impress.js," retrieved on Feb. 13, 2013 at <<http://bartaz.github.com/impress.js/#/title>>, 4 pages.
Iqbal et al., "Peripheral Computing During Presentations: Perspectives on Costs and Preferences," retrieved on Feb. 9, 2013 at <<http://citeseerx.ist.psu.edu/viewdoc/download?doi=10.1.1.188.4197&rep=rep1&type=pdf>>, Proceedings of Conference on Human Factors in Computing Systems (CHI), May 7, 2011, pp. 891-894.
Kurihara et al., "Presentation Sensei: A Presentation Training System using Speech and Image Processing," retrieved on Feb. 9, 2013 at <<http://www.unryu.org/home/papers/icmi130-kurihara.pdf>>, Proceedings of Intl. Conference on Multimodal Interfaces (ICMI), Nov. 12, 2007, pp. 358-365.

(56) References Cited

OTHER PUBLICATIONS

Lane et al., "Cafe-style PowerPoint: Navigation's Conversational Touch," retrieved on Mar. 5, 2013 at <<http://office.microsoft.com/en-in/powerpoint-help/cafe-style-powerpoint-navigation-s-conversational-touch-HA010274710.aspx>>, Microsoft Corporation, 2013, 5 pages.

Lanir et al., "Observing Presenters' Use of Visual Aids to Inform the Design of Classroom Presentation Software," retrieved on Feb. 9, 2013 at <<http://nguyendangbinh.org/Proceedings/CHI/2008/docs/p695.pdf>>, Proceedings of Conference on Human Factors in Computing Systems (CHI), Apr. 5, 2008, pp. 695-704.

Levasseur et al., "Pedagogy Meets PowerPoint: A Research Review of the Effects of Computer-Generated Slides in the Classroom," retrieved on Feb. 9, 2013 at <<http://flc-ppt-plus.wikispaces.com/file/view/LevasseurandSawyer.pdf>>, National Communication Association, The Review of Communication, vol. 6, No. 1-2, Jan.-Apr. 2006, pp. 101-123.

Lichtschlag et al., "Canvas Presentations in the Wild," CHI 12 EA, 2012, pp. 537-540.

Lichtschlag, "Fly an Organic Authoring Tool for Presentations," published Nov. 10, 2008, In proceedings: In Diploma Thesis at the Media Computing Group, retrieved at <<http://hci.rwth-aachen.de/materials/publications/lichtschlag2008.pdf>>, 114 pages (in 2 parts).

Lichtschlag et al., "Fly: Studying Recall, Macrostructure Understanding, and User Experience of Canvas Presentations," Session: Space: The Interaction Frontier, CHI 2012, May 5-10, 2012, Austin, Texas, USA, 4 pages.

Lichtschlag et al., "Fly: A Tool to Author Planar Presentations," retrieved on Feb. 9, 2013 at <<https://hci.rwthaachen.de/materials/publications/lichtschlag2009.pdf>>, Proceedings of Conference on Human Factors in Computing Systems (CHI), Apr. 4, 2009, pp. 547-556.

Mayer, "Multi-Media Learning," New York: Cambridge University Press, 2009, 2nd edition, 162 pages.

Mayer, "Multimedia Learning: Are We Asking the Right Questions?" retrieved on Feb. 9, 2013 at <<http://www.uky.edu/gmswan3/544/mayer_1997.pdf>>, Journal of Educational Psychologist, vol. 32, No. 1, 1997, pp. 1-19.

Mayer et al., "Nine Ways to Reduce Cognitive Load in Multimedia Learning," retrieved on Feb. 9, 2013 at <<http://www.uky.edu/~mswan3/544/9_ways_to_reduce_CL.pdf>>, Journal of Educational Psychologist, vol. 38, No. 1, 2003, pp. 43-52.

"Microsoft PowerPoint," retrieved on Feb. 13, 2013 at <<http://office.microsoft.com/en-us/powerpoint>>, Microsoft Corporation, 2013, 2 pages.

Moscovich et al., "Customizable Presentations," retrieved on Feb. 9, 2013 at <<http://www.moscovich.net/tomer/papers/cpresentations.pdf>>, Proceedings of Intl. Conference on Multimodal Interfaces (ICMI), Nov. 5, 2003, 5 pages.

Nelson et al., "Palette: A Paper Interface for Giving Presentations," retrieved on Feb. 9, 2013 at <<http://citeseerx.ist.psu.edu/viewdoc/download?doi=10.1.1.39.5686&rep=rep1&type=pdf>>, Proceedings of Conference on Human Factors in Computing Systems (CHI), May 1999, pp. 354-361.

Nelson et al., "Pictorial Superiority Effect. Journal of Experimental Psychology: Human Learning & Memory," Sep. 1976, vol. 2, pp. 523-528.

Norman, "In Defense of PowerPoint," retrieved on Feb. 13, 2013 at <<http://www.jnd.org/dn.mss/in_defense_of_p.html>>, 2004, 5 pages.

Pavivio, "Mental Representations: A Dual Coding Approach," Oxford University Press, 1990, 170 pages (2 parts).

Panjwani et al., "Collage: A Presentation Tool for School Teachers," retrieved on Feb. 9, 2013 at <<http://www.gg.rhul.ac.uk/ict4d/ictd2010/papers/ICTD2010%20Panjwani%20et%20al.pdf>>, Proceedings of ACM/IEEE Intl. Conference on Information and Communication Technologies and Development (ICTD), Article No. 30, Dec. 13, 2010, 10 pages.

Parker, "Absolute PowerPoint: Can a Software Package Edit our Thoughts?" retrieved on Feb. 9, 2013 at <<http://www.utdallas.edu/~dxt023000/courses/6331/readings/Anti-PowerPoint.pdf>>, The New Yorker, May 28, 2001, 15 pages.

PCT Patent Application No. PCT/CN2013/072061, filed on Mar. 1, 2013, Koji Yatani et al., "Dynamic Presentation Prototyping," 10 pages.

PCT Patent Application PCT/CN2013/078288 filed on Jun. 28, 2013, Koji Yatani et al., "Selecting and Editing Visual Elements with Attribute Groups," 44 pages.

"Pecha Kucha 20x20," retrieved Feb. 13, 2013 at <<http://www.pechakucha.org/>>, 2013, 5 pages.

"PPTPlex PowerPoint Add-In," retrieved on Feb. 13, 2013 at <<http://www.microsoft.com/en-us/download/details.aspx?id=28558>>, Microsoft Corporation, Dec. 15, 2011, 2 pages.

"Prezi—Ideas matter," retrieved on Feb. 13, 2013 at <<http://prezi.com/>>, Prezi Inc., 2013, 3 pages.

Raggett, "HTML Slidy: Slide Shows in HTML and XHTML," retrieved on Feb. 13, 2013 at <<http://www.w3.org/Talks/Tools/Slidy2/#(1)>>, W3C, 2013, 23 pages.

Reynolds, "Presentation Zen: Simple Ideas on Presentation Design and Delivery," New Riders, 2008, 234 pages.

Roberts, "Aristotle's Rhetoric," retrieved on Feb. 12, 2013 at <<http://rhetoric.eserver.org/aristotle/>>, Alpine Lakes Design, A hypertextual resource compiled by Lee Honeycutt, 2011, 1 page.

Signer et al., "PaperPoint: A Paper-Based Presentation and Interactive Paper Prototyping Tool," retrieved on Feb. 9, 2013 at <<http://citeseerx.ist.psu.edu/viewdoc/download?doi=10.1.1.71.6985&rep=rep1&type=pdf>>, Proceedings of Intl Conference on Tangible and Embedded Interaction (TEI), Feb. 15, 2007, p. 57-64.

"SlideShare," retrieved on Feb. 13, 2013 at <<http://www.slideshare.net/>>, SlideShare Inc., 2013, 9 pages.

Spicer et al., "NextSlidePlease: Authoring and Delivering Agile Multimedia Presentations," retrieved on Feb. 9, 2013 at <<http://ame2.asu.edu/faculty/hs/pubs/2012/2012_nsp.pdf>>, Journal of ACM Transactions on Multimedia Computing, Communications, and Applications (TOMCCAP), vol. 2, No. 3, May 2010, 25 pages.

Stiller et al., "Presentation time concerning system-paced multimedia," Australian Journal of Educational Technology, vol. 27, Issue 4, Aug. 2011, pp. 693-708.

Sweller, "Cognitive Load During Problem Solving: Effects on Learning," retrieved on Feb. 9, 2013 at <<http://csjarchive.cogsci.rpi.edu/1988v12/i02/p0257p0285/main.pdf>>, Journal of Cognitive Science, vol. 12, No. 2, Apr. 1988, pp. 257-285.

Tam, "The Design and Field Observation of a Haptic Notification System," In Phd Thesis Submitted in Partial Fulfillment of the Requirements for the Degree of Master of Science, The University of British Columbia, Vancouver, BC, Canada, Oct. 2012, 120 pages.

Teevan et al., "Displaying Mobile Feedback during a Presentation," retrieved on Feb. 9, 2013 at <<http://research.microsoft.com/en-us/um/people/teevan/publications/papers/mobilehci12.pdf>>, Proceedings of Intl. Conference on Human-Computer Interaction with Mobile Devices and Services (MobileHCI), Sep. 21, 2012, 4 pages.

The Beamer Package, retrieved on Feb. 12, 2013 at <<http://en.wikibooks.org/wiki/LaTeX/Presentations>>, Wikimedia, 2011, 12 pages.

Tufte, "The Cognitive Style of PowerPoint: Pitchng Out Corrupts Within," 2003, Graphics Press, 28 pages.

"Tutorial: an Introduction to the Magic Move Transition in Keynote," retrieved on Aug. 30, 2013 at <<http://www.keynoteclassroom.com/index_files/Tutorial-Magic-Move.html>>, 2 pages.

Tweening in PowerPoint, published on Feb. 2, 2010, retrieved at <<http://www.pptalchemy.co.uk/Tweeny.html>>, 2 pages.

Weissman, "Presenting to Win: The Art of Telling Your Story," FT Press, 2009, 268 pages.

Weissman, "The Power Presenter: Technique, Style, and Strategy from America's Top Speaking Coach," Wiley, 2009, 135 pages.

"Welcome to the Open XML SDK 2.5 CTP for Office," retrieved on Feb. 9, 2013 at <<http://msdn.microsoft.com/en-us/library/office/bb448854.aspx>>, Microsoft Corporation, Aug. 22, 2012, 2 pages.

(56) References Cited

OTHER PUBLICATIONS

Wozniak et al., "Optimization of Repetition Spacing in the Practice of Learning," retrieved on Feb. 9, 2013 at <<http://www.ane.pl/pdf/5409.pdf>>, Journal of Acta Neurobiologiae Experimentalis, vol. 54, No. 1, 1994, pp. 59-62.

Yonge, translation of Cicero's De Inventione, "Treatise on Rhetorical Invention," retrieved on Feb. 12, 2013 at <<http://www.classicpersuasion.org/pw/cicero/dnvindex.htm>>, The Orations of Marcus Tullius Cicero: Cicero's De Inventione translated by C. D. Yonge, George Bell and Sons, London, vol. 4, 1888, pp. 241-380.

Zongker, "Creating Animation for Presentations," retrieved on Feb. 9, 2013 at <<http://grail.cs.washington.edu/theses/ZongkerPhd.pdf>>, PhD Dissertation, University of Washington, 2003, 228 pages.

"International Search Report & Written Opinion for PCT Patent Application No. PCT/US2014/064714", dated Mar. 24, 2015, 10 Pages.

Wikipedia: "Laptop", retrieved on Mar. 16, 2015 at <<http://en.wikipedia.org/w/index.php?title=Laptop&oldid=580975732>>, Wikipedia, 23 pgs.

Wikipedia: "Microsoft PowerPoinPowerPoint", retrieved on Mar. 13, 2015 at <<http://en.wikipedia.ore/w/index.php?title=Microsoft_PowerPoint&oldid+580301821>>, Wikipedia, 10 pgs.

Office action for U.S. Appl. No. 13/898,338, dated Apr. 8, 2015, Edge et al., "Adaptive Timing Support for Presentations", 15 pages.

Wikipedia: "Presentation program", retrieved on Mar. 13, 2015 at <<http://en.wikipedia.org/w/index.php?title=Presentation_program&oldid=580933046>>, Wikipedia, 3 pgs.

The PCT Search Report and Written Opinion dated Jul. 1, 2014 for PCT application No. PCT/CN2013/084565, 11 pages.

Office action for U.S. Appl. No. 13/898,338, dated Apr. 15, 2016, Edge et al., "Adaptive Timing Suppor for Presentations", 17 pages.

Wikipedia, "Digital Dictation", Internet Article, Mar. 22, 2013, retrieved on Jul. 29, 2015 at: https://en.wikipedia.org/w/index.php?title=Digital_dictation&oldid=546255522, Wikipedia, 3 pages.

Edge et al., "HyperSlides: Dynamic Presentation Prototyping", In ACM SIGCHI Conference on Human Factors in Computing Systems, Apr. 29, 2013, 10 pages.

Mamykina et al., "Time Aura Interfaces for Pacing", CHI 2001 Conference on Human Factors in Computing Systems, Mar.-Apr. 2001, vol. 3, Issue 1, pp. 144-151.

U.S. Appl. No. 13/898,338, Edge et al., "Adaptive Timing Support for Presentations", filed May 20, 2013, 55 pages.

PCT International Search Report and Written Opinion in International Application PCT/US2014/064714, dated Mar. 24, 2015, 10 pages.

Wikipedia, "Laptop" retrieved Mar. 16, 2015 at: http://en.wikipedia.org/w/index.php?title=Laptop&oldid=580975732, Wikipedia, 19 pages.

European Office Action in EP Application 13876698.5, dated Dec. 18, 2015, a foreign counterpart application to U.S. Appl. No. 13/933,030, 6 pages.

U.S. Appl. No. 13/898,338, Office Action dated Dec. 15, 2015, Edge et al., "Adaptive Timing Support for Presentations", 16 pages.

Career Track, "QuickClicks Reference Guide to Microsoft Powerpoint 2010", published by Career Track, a division of Park Univ. Enterprises, Inc., 2011, 4 pages.

U.S. Appl. No. 14/077,674, Office Action dated Feb. 1, 2016, 33 pages.

European Office Action dated Apr. 4, 2016 in EP Application 14730712.8, a counterpart application for U.S. Appl. No. 13/898,338, 5 pages.

U.S. Appl. No. 13/898,338, Office Action dated Apr. 15, 2016, 17 pages.

European Search Report dated Mar. 15, 2016 in EP Patent Appl. 14730712.8, 4 pages.

PCT International Preliminary Report on Patentability in Application PCT/US2014/064714, dated Feb. 15, 2016, 8 pages.

\* cited by examiner

*ACME*

FIG. 21

*ACME*

ACME

FOUNDED

1937

*ACME*

1939

IMPORT
FOUNDED
DEBUT

ACME

IMPORT
FOUNDED
DEBUT

IMPORT
DEBUT

*ACME*

ACME

IMPORT DEBUT

*ACME*

*ACME*

FIG. 29

MEDIA PRESENTATION EFFECTS

CROSS REFERENCE TO RELATED APPLICATIONS

This application is a continuation of PCT International Application No PCT/CN2013/084565, filed Sep. 29, 2013, the entire contents of which are incorporated herein by reference.

BACKGROUND

While presentation slides may provide a convenient and reusable authoring environment for presentation visuals, such slides may be used in a manner that is more appropriate for a document (e.g., large amounts of text, dense diagrams, and raw tabular data) than for speaker support. Presenting such material may be problematic for both the presenter and the audience. For example, excessive slide text may encourage the audience to read the slide rather than listen to the presenter. Further, abrupt transitions from one slide to another may result in a loss of visual context and may make the relationship between slide contents implicit. The presenter may prepare for a transition and make an appropriate verbal linkage. However, in the event that the presenter does not make such an explicit verbal connection, the audience may not be able to determine whether a logical connection exists between slides.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide techniques and arrangements for displaying a user interface that allows a user to create and manage shapes and shape transitions across multiple slides. In some examples, the user may select a slide via the user interface and one or more shape threads associated with the selected slide may be presented (e.g., via an effects pane). Each shape displayed on the selected slide may be associated with a shape thread, and the attributes of each shape may be independently definable via the associated shape threads.

In some implementations, different shapes transition at different rates in response to navigation between slides. In some cases, the user may independently vary a delay before each shape begins transitioning. To illustrate, an amount of time for one shape to transition between slides may be different from an amount of time for another shape to transition between slides. Further, in some implementations, semantic interpolation allows for transitions of non-continuous attributes (e.g., a year, a date, etc.) between slides.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

FIGS. 21-29 illustrate an example presentation of the media effects created and managed in the example user interface of FIGS. 1-20, according to some implementations.

DETAILED DESCRIPTION

Overview

As discussed above, presentation slides may often be used in a manner that is more appropriate for a document than for supporting presenters. For example, excessive slide text and abrupt transitions between slides may be problematic for both the presenter and the audience. Presenters may attempt to enhance a presentation by animating transitions between slides or animating shapes on a particular slide. However, such incidental animation may not support the act of communication and may instead prove counterproductive by distracting or confusing the audience. While linear interpolation of object attributes between slides (e.g., "tweening" or "in-betweening") may be possible, existing solutions do not allow for independent management of the attributes of each object individually. Rather, when transitioning between slides, existing solutions use linear interpolation over the same period of time for each object. Transitioning each object over the same period of time may prevent one object from transitioning at one speed and finishing the transition earlier, while another object transitions at another speed and finishes the transition later. Further, existing solutions do not provide for interpolation of non-continuous attributes (e.g., semantic attributes) between slides.

The present disclosure describes techniques and arrangements for creating and managing media effects to provide a more cinematic experience that may improve audience engagement by avoiding distracting incidental animation and allowing the presenter to control intra-slide and inter-slide animations and transitions. Some implementations include a user interface that may allow a user to independently control attributes of each individual shape within a slide as well as attributes of each individual shape between slides. Thus, the user interface may allow the user to manage individual shapes such that the shapes may evolve in a meaningful way during the presentation.

In some implementations, semantic attributes of a shape may be interpolated. As used herein, the term "semantic attribute" refers to a non-continuous attribute (e.g, alphabetical text or numerical values on a slide) in which at least an attribute context (e.g., whether the attribute represents a date, a time, a year, etc.) is used to determine how to properly interpolate attribute values between slides. By contrast, for a continuous attribute (e.g., position values, size values, or color values of an image), interpolation of attribute values between slides may be achieved based on an initial attribute value and a target attribute value without determining the context of the attribute. Semantic attributes may be interpolated between slides by, for example, presenting sequential values (e.g., 1, 2, 3, . . . N; A, B, C, . . . Z; etc.) of the semantic attributes over the interpolation period (i.e., between slides).

Example Implementations

Figure 1:
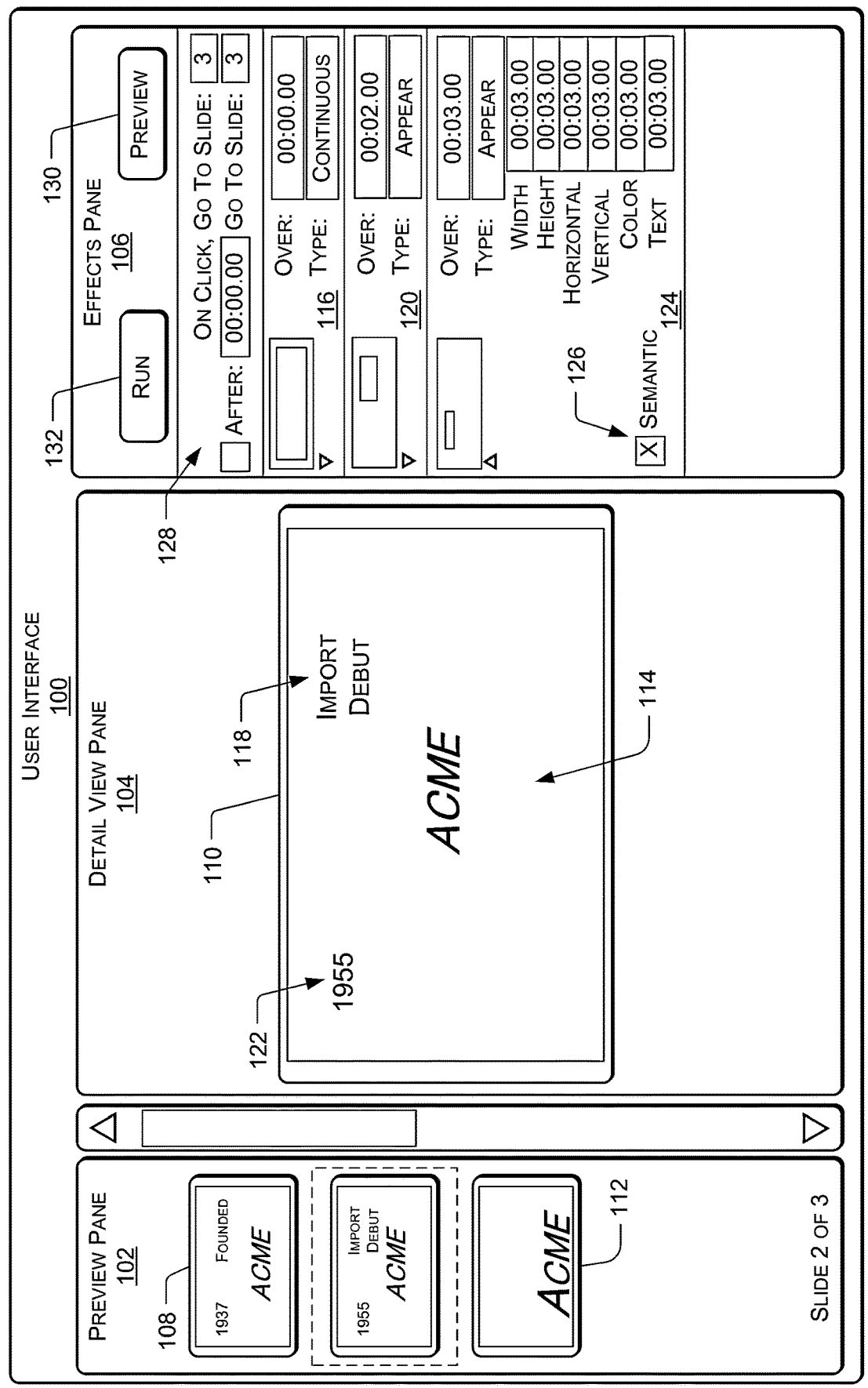
FIGS. 1-20 illustrate a sequence of view of an example user interface for creating and managing presentation media effects, according to some implementations.

FIGS. 1-20 illustrate examples of a user interface 100 that may be displayed via a computing device (e.g., on the display device 3208 of the computing device 3200 of FIG. 32 described below) and examples of user interaction with the user interface 100. The user interface 100 may allow a user to create and manage media effects, while potentially avoiding problems that may be associated with slide transitions and shape animations. FIG. 1 illustrates an example of the user interface 100 according to some implementations. In the example illustrated in FIG. 1, the user interface 100 includes a preview pane 102, a detail view pane 104, and an effects pane 106.

The preview pane 102 may allow a user to select a particular slide to be presented in the detail view pane 104. FIG. 1 illustrates an example of a presentation that includes a first slide 108, a second slide 110, and a third slide 112. However, it will be appreciated that a presentation may include an alternative number of slides. For illustrative purposes only, a dashed line is shown around the second slide 110 in the preview pane 102 in order to indicate that the second slide 110 is the current slide that is displayed in the detail view pane 104. However, it will be appreciated that alternative methods of identifying the currently displayed slide (e.g., color, size, etc.) may also be used. Further, in some cases, the currently displayed slide (e.g., "Slide 2 of 3") may be included in the preview pane 102 to assist the user in identifying the current location in the presentation. In some implementations, each slide in the preview pane 102 may include thumbnail images or other representations of the "shapes" that are displayed in more detail in the detail view pane 104. As used herein, the term "shape" may represent an object that includes an image, alphabetical text, numerical values, or video, among other alternatives.

The effects pane 106 may display "shape threads" corresponding to the particular slide that is currently displayed in the detail view pane 104. Each shape on each slide may be associated with a shape thread. As used herein, the term "shape thread" refers to the connection or path of shapes across slides. By connecting shapes across slides, a shape thread may allow the user to independently define an on-screen transition behavior of each shape individually. That is, the effects pane 106 allows a user to independently manage the behavior of each of the shapes within a particular slide ("intra-slide") and between slides ("inter-slide") via corresponding shape threads.

By creating a new slide for each step of an animated progression, the user may visualize the temporal changes in the user interface 100. This may create a high degree of inter-slide continuity, as shape animations or other transitions are not limited to a single slide. Further, the ability to individually manage the behavior of each shape within a particular slide may allow for a high degree of intra-slide continuity, as it may be desirable for each shape to behave differently within a particular slide.

In the example of FIG. 1, the second slide 110 is currently displayed in the detail view pane 104. Accordingly, the effects pane 106 displays the shapes that are associated with the second slide 110. When building a presentation, the effects pane 106 may allow the user to view and edit shape threads across multiple (two or more) slides, preview the presentation from the currently displayed slide, and set slide-specific navigation and advancement options.

In the example of FIG. 1, the second slide 110 includes a first shape 114 (e.g., a background image of a company logo for the "Acme" corporation). The effects pane 106 identifies a first shape thread 116 that is associated with the first shape 114. The second slide 110 also includes a second shape 118 (e.g., the alphabetical text "Import Debut") that may be displayed in the foreground. That is, the second shape 118 may be displayed on top of the first shape 114. The effects pane 106 identifies a second shape thread 120 that is associated with the second shape 118. The second slide 110 further includes a third shape 122 (e.g., the numerical year "1955") that may be displayed in the foreground. The effects pane 106 identifies a third shape thread 124 that is associated with the third shape 122.

In the example of FIG. 1, the third shape 122 on the second slide 110 may correspond to a year (e.g., the year 1955) which may represent the target year from an initial year of 1937 (as illustrated in the preview pane 102 for the first slide 108). In this example, semantic interpolation may include an interpolation (e.g., a linear or non-liner transition) from the year 1937 to the year 1955 when transitioning between the first slide 108 and the second slide 110. As an illustrative example, in response to the user clicking the first slide 108 to advance to the second slide 110, the year may advance linearly (or non-linearly) from 1937 to 1955 during the slide transition (see e.g., FIGS. 24-26 described below). In some implementations, the transition is incremental. For example, the increment may be a default (e.g., increments of one year), may be explicitly set by the user, or may be inferred based on a number of slides between a first state and a target state, or an estimated time of presentation, among other alternatives.

The shape threads 116, 120, 124 displayed in the effects pane 106 may allow the user to customize a presentation such that shapes may evolve (i.e., move and/or change) in a meaningful way over time. To illustrate, a user may duplicate or copy and paste an existing slide to create a new slide, make changes to the new slide, and identify individual time periods over which various changes are to unfold when transitioning between slides. That is, for each slide in a presentation, the effects pane 106 may allow the user to identify independent time periods for each shape to reach a "target" or end state. To illustrate, the effects pane 106 identifies an endpoint of each shape and a relationship to a previous slide, while allowing shape transitions on different time scales.

Figure 3:
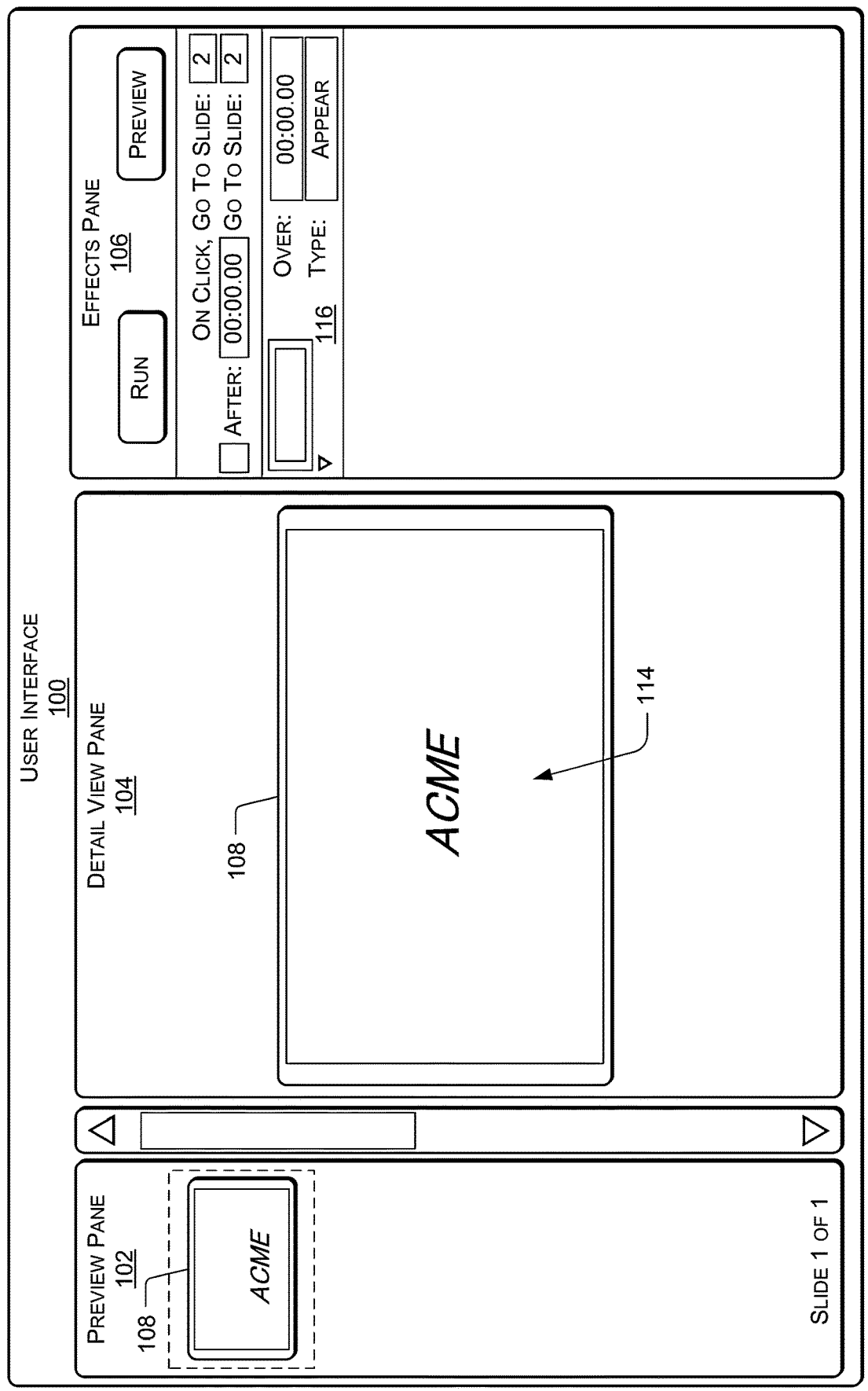

A newly created shape may appear in the effects pane 106 with the "Appear" effect type (see e.g., FIG. 3 illustrating the creation of the first shape 114 on the first slide 108). A slide that is duplicated from the previous slide connects the corresponding shapes across slides and indicates in the effects pane 106 that the particular shape belongs to a shape thread that shows the "target" state change from the previous slide. Any changes made to the particular shape on the second slide 110 represent the result of automatic interpolation (e.g., "tweening" or "in-betweening") of the state of the particular shape from the state on the first slide 108. For each shape, interpolation may occur over independent time periods that may be individually defined by the user in the effects pane 106 or may be defaults or inferred based on circumstances (e.g., previous slides, presentations, etc.).

In the example of FIG. 1, each of the shape threads 116, 120, 124 identifies a location of each shape on the currently displayed slide. For example, the first shape 114 of the second slide 110 is illustrated in the first shape thread 116 as occupying most of the second slide 110 (e.g., a background image). Further, the second shape 118 is illustrated in the second shape thread 120 in the top right with a size that may be proportional to the size of the second shape 118, while the third shape 122 is illustrated in the third shape thread 124 in the top left with a size that may be proportional to the size of the third shape 122. Alternative methods of identifying the individual shapes in the effects pane 106 may also be used. For example, a number may be associated with a particular shape (e.g., the number one with the first shape 114, the number two with the second shape 118, and the number three with the third shape 122), and the same number may be used to identify the particular shape on each slide in which it appears.

In some implementations, linear interpolation is used for transitioning continuous attributes, such as spatial attributes, color-based attributes, font attributes, format attributes, or image attributes. For a continuous attribute, interpolation of attribute values between slides may be achieved based on an initial attribute value and a target attribute value without determining the context of the attribute. By contrast, for a non-continuous attribute (e.g., a semantic attribute), an attribute context (e.g., whether the attribute represents a date, a time, a year, etc.) be used to determine how to properly interpolate the non-continuous attribute values between slides. As an illustrative example of a continuous attribute, if an image appears on one slide at the top left (e.g., at position x1, y1) and appears on a subsequent slide at the bottom right (e.g., at position x2, y2), the spatial attributes (e.g., the relative positions) may be used to linearly transition the image between slides. That is, during a slide transition, the position of the image would linearly transition along an x-axis based on the difference between the x coordinates (e.g., x2 minus x1) and would linearly transition along a y-axis based on the difference between the y coordinates (e.g., y2 minus y1). By contrast, as an illustrative example of a non-continuous attribute, if first text (e.g., "January") appears on one slide and second text (e.g., "December") appears on another slide, the context of the text being a month may allow for the text to be properly interpolated during a slide transition. In this example, by identifying the text as a month, the text may transition from January to February, from February to March, etc. until reaching the target month of December.

In some implementations, continuous attribute interpolation is non-linear. As an illustrative example, an attribute value change may be slow initially, then speed up. Alternatively, the attribute value change may be fast initially, then slow down. As another illustrative example, the change may "ease" in multiple directions through an appropriately defined mathematical easing function. Such an easing function may be selected from a list of preset functions or may be constructed by a user (e.g., with a vertical axis representing a rate of change and a horizontal axis representing time). Further, negative rates of attribute value change may indicate "tweening" away from a target value in a way that could be used to create an overshooting effect before bouncing back. In some cases, an option (not shown in FIG. 1) may allow the user to sketch a non-linear motion path for a shape transition. This may simultaneously capture the intended easing function (e.g., by examining the timing of the sketched path). The path and the easing function may be automatically smoothed and later manipulated directly by the user.

With respect to continuous attributes, examples of spatial attributes may include width, height, x position, y position, left edge x position, right edge x position, top edge y position, bottom edge y position, or location and scale values from some other (e.g., polar) coordinate system. Examples of color-based attributes may include transparency, hue, saturation, brightness, alpha, red, green, blue, or some other color system. Examples of font attributes may include size, face, color, kerning, line spacing, or text effect (e.g., shadow angle, glow radius). Examples of format attributes may include fill color, line color, line weight, or shape effect (e.g., reflection depth, reflection separation). Examples of image attributes may include brightness, contrast, crop (each edge), among other alternatives.

In the example illustrated in FIG. 1, the third shape thread 124 identifies other attributes of the third shape 122 that may be independently adjusted. For example, the additional independently adjustable shape attributes may include a width transition of the shape, a height transition of the shape, a horizontal transition of the shape, a vertical transition of the shape, a color transition of the shape, or a text transition of the shape, among other alternatives. In an example embodiment, independent adjustment of attributes allows the color of the text of the third shape 122 (i.e., "1955") to change over one period of time, while the size of the third shape 122 changes over a different period of time.

FIG. 1 further illustrates a selectable semantic transition icon 126. As described further with respect to FIG. 19 and illustrated in FIGS. 24-26, semantic transitions may include transitions associated with interpolation of "non-continuous" attributes such as alphabetical text or numerical values, among other alternatives. Semantic attributes may include numerical attributes, date and time attributes, typesetting attributes, or text attributes, among other alternatives. Examples of non-continuous numerical attributes may include a time interval (e.g., 1, 2, 3) or an ordinal (e.g., 1st, 2nd, $3^{rd}$). Examples of date and time attributes may include a time (e.g., 21:15), a date (31 Jan. 1982), or a combination of date and time (e.g., 2008 Aug. 8 8 pm). An example of a text attribute may include words used, and semantic interpolation can include morphing one set of words into another by only blending out/in the differences between text strings.

As an illustrative example, selection of the semantic transition icon 126 may allow for a linear or non-linear (e.g., exponential) interpolation from the year 1937 in the first slide 108 to the year 1955 in the second slide 110. While FIG. 1 illustrates a year as an example of a non-continuous attribute, it will be appreciated that semantic transitions may also occur with respect to days of the week, months of the year, among other alternatives. Further, semantic transitions may include morphing text or images based on similarities. For example, the user may want to show several versions of different dates or places. Accordingly, invariate portions of text may be fixed while variable portions of the text may be smoothly blended in and out. As another illustrative example, semantic transitions may include gradually increasing or decreasing spacing between letters or numbers over a particular period of time. It will be appreciated that various other semantic transitions may be possible.

In some implementations, slides are set to advance to a non-consecutive slide, or to advance automatically after a specified time period to a specified slide. In some examples, a default slide transition option may be for the user to advance to the next slide by clicking on the current slide. However, as illustrated in FIG. 1, a slide transition area 128 may allow the user to manually identify a time period after which the presentation automatically advances to another slide. As illustrated in the slide transition area 128 of FIG.

1, the user may select to advance to a non-consecutive slide or to advance automatically after a specified time period to a specified slide.

The user interface 100 may also include a selectable Preview icon 130 to preview the presentation for the slide currently displayed in the detail view pane 104 (e.g., the second slide 110). Further, the user interface 100 may include a selectable Run icon 132 to begin the presentation, starting with the first slide 108.

FIGS. 2-20 illustrate examples of user interactions with the user interface 100 to create the presentation illustrated in FIG. 1, while FIGS. 21-29 illustrate the presentation that is initiated in response to the user selecting the Run icon 132.

Figure 2:
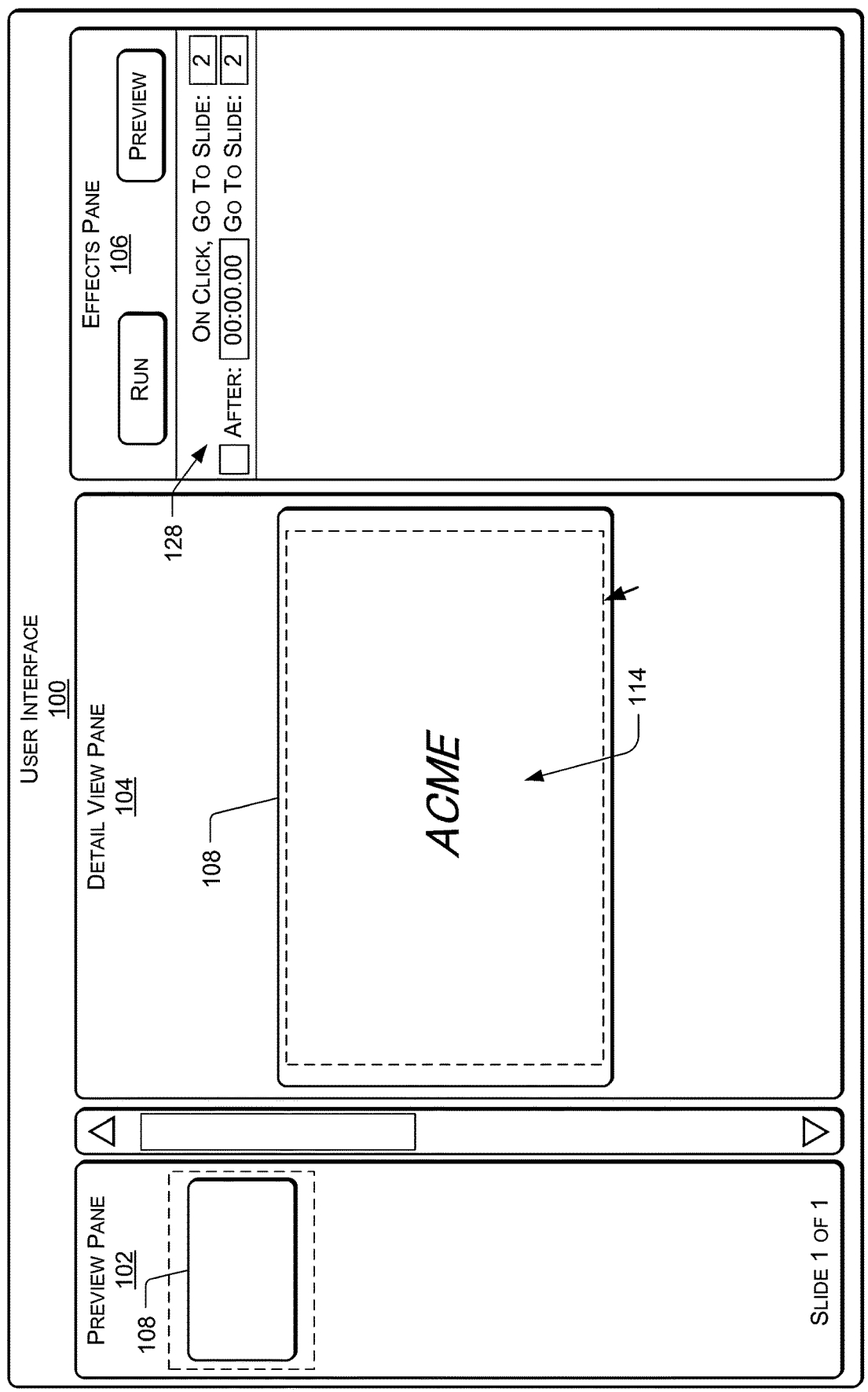

Referring to FIG. 2, the user may add the first shape 114 to the first slide 108. As an illustrative non-limiting example, the user may identify an image to be added to the first slide 108 via a menu (not shown) that may be presented via the user interface 100. Further, in the illustrative example of FIG. 2, the user may resize or otherwise manipulate the first shape 114 via a cursor.

In some cases, as illustrated in FIG. 2, the first shape thread 116 may not appear in the effects pane 106 until after the user has added the first shape 114 to the first slide 108. FIG. 3 illustrates that the first shape thread 116 may be added to the effects pane 106 after the first shape 114 has been added to the first slide 108. FIG. 3 further illustrates that the "Type" of the first shape 114 is set to "Appear" as this is the first instance of the shape in the presentation. Further, as this is the first instance of the first shape 114 in the presentation, the "Over" time may represent the time period over which the first shape 114 appears on the first slide 108 after the initiation of the presentation. In the example of FIG. 3, a default time to appear (e.g., zero seconds) may be associated with a new shape having the "Appear" type. That is, the first shape 114 may appear upon initiation of the presentation of the first slide 108. However, as described below, it will be appreciated that a default time to appear may be adjusted by the user.

Figure 4:
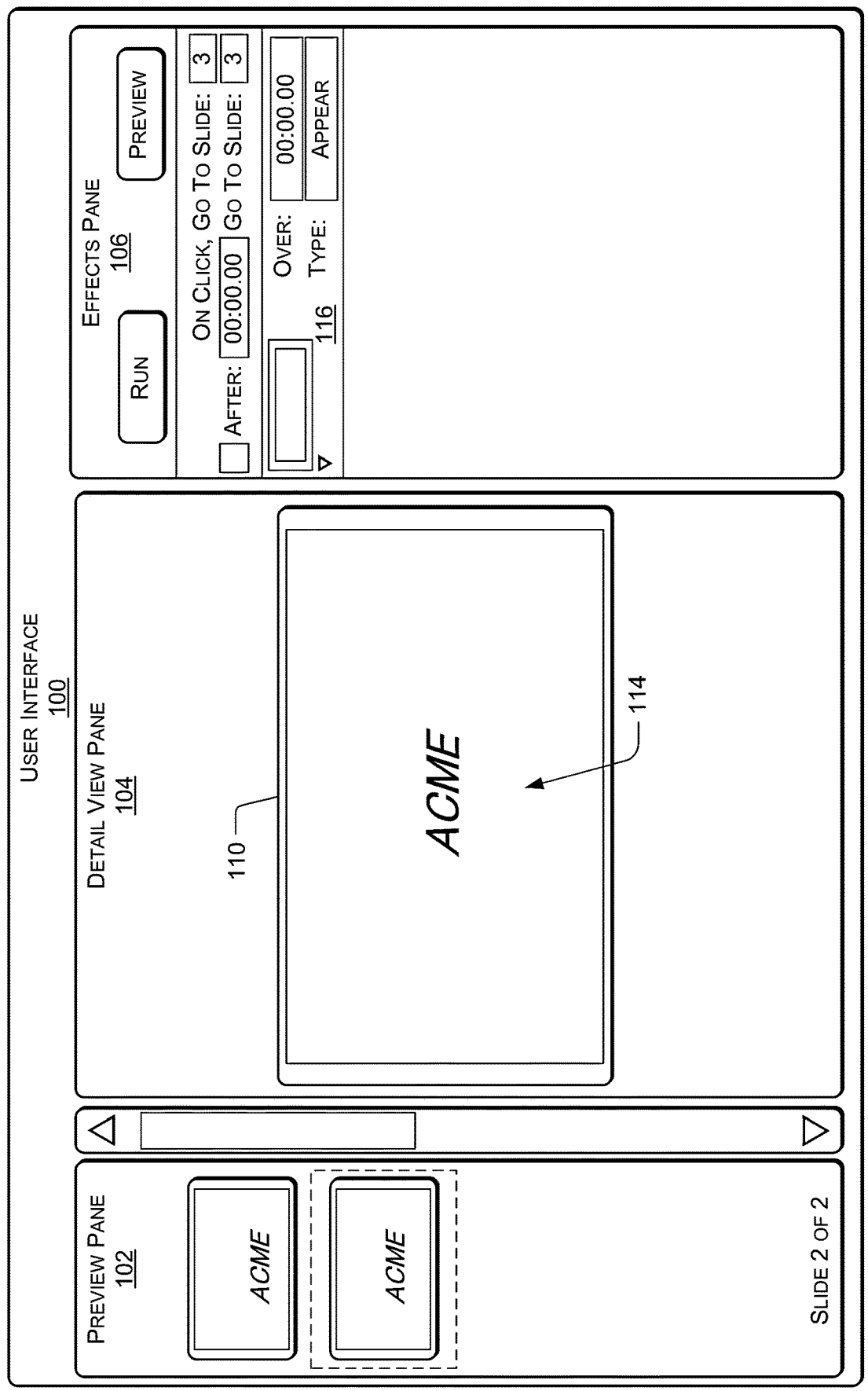

Referring to FIG. 4, in some implementations, the user copies the first slide 108 and pastes the first slide 108 in the preview pane 102 to create the second slide 110. Alternatively, the user may duplicate the slide (e.g., by selecting a duplication control). As shown in FIG. 4, the second slide 110 includes the first shape 114, and the effects pane 106 identifies the first shape thread 116 as associated with the second slide 110.

FIG. 4 further illustrates that the "Type" of the first shape 114 on the second slide 110 is set to "Appear" in the effects pane 106. In this case, the "Over" time may represent the time period over which the first shape 114 transitions from the state on the previous slide (e.g., the first slide 108) to the state on the second slide 110 in response to the user advancing the second slide 110.

Figure 5:
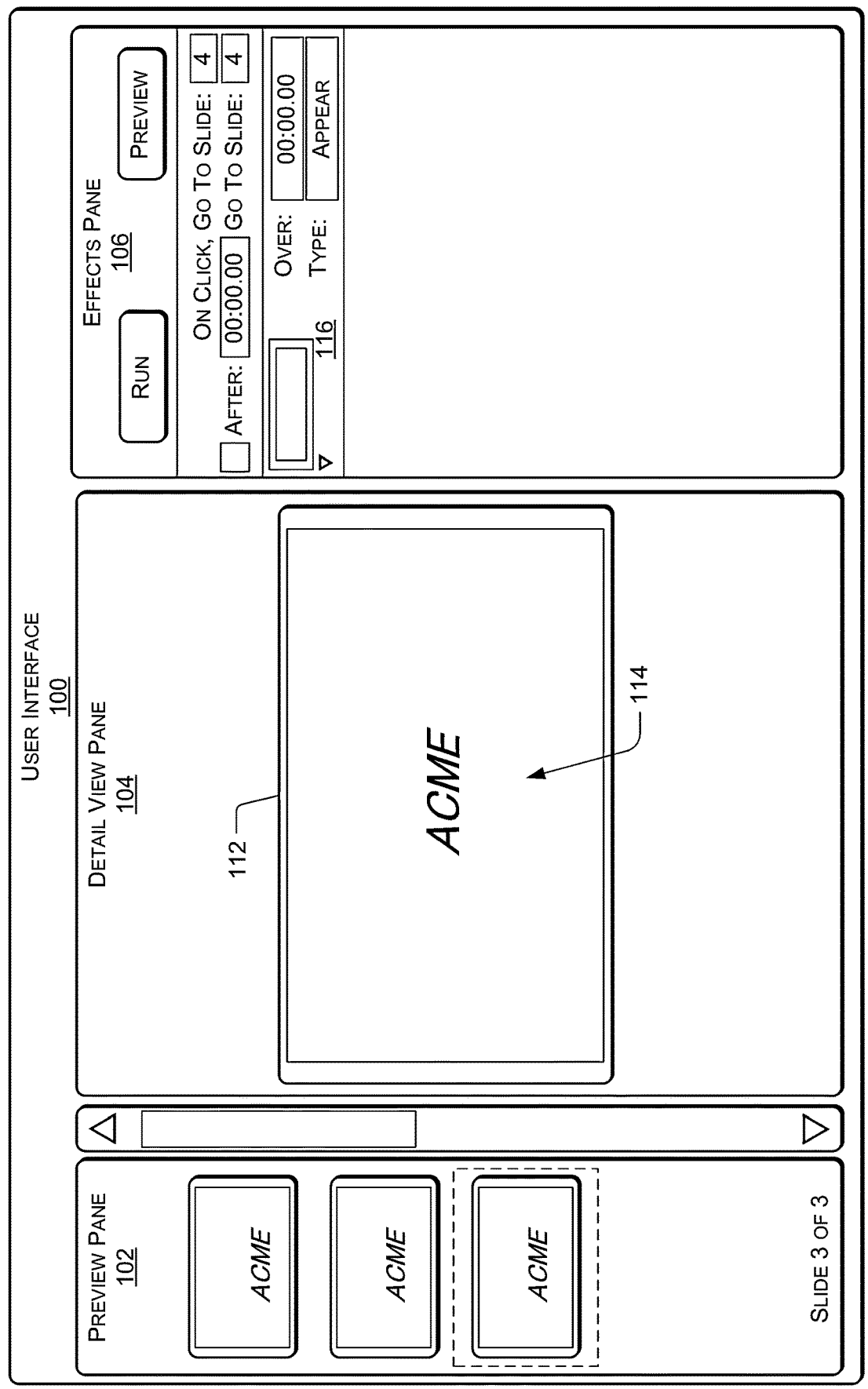

Referring to FIG. 5, the user may copy the second slide 110 and paste the second slide 110 into the preview pane 102 or otherwise duplicate the second slide 110 to create the third slide 112. As shown in FIG. 5, the third slide 112 includes the first shape 114, and the effects pane 106 identifies the first shape thread 116 as associated with the third slide 112.

FIG. 5 further illustrates that the "Type" of the first shape 114 is set to "Appear" on the third slide 112. The "Over" time may represent the time over which the first shape 114 transitions from the state on the previous slide (e.g., the second slide 110) in response to the user selecting to advance to the third slide 112.

Figure 6:
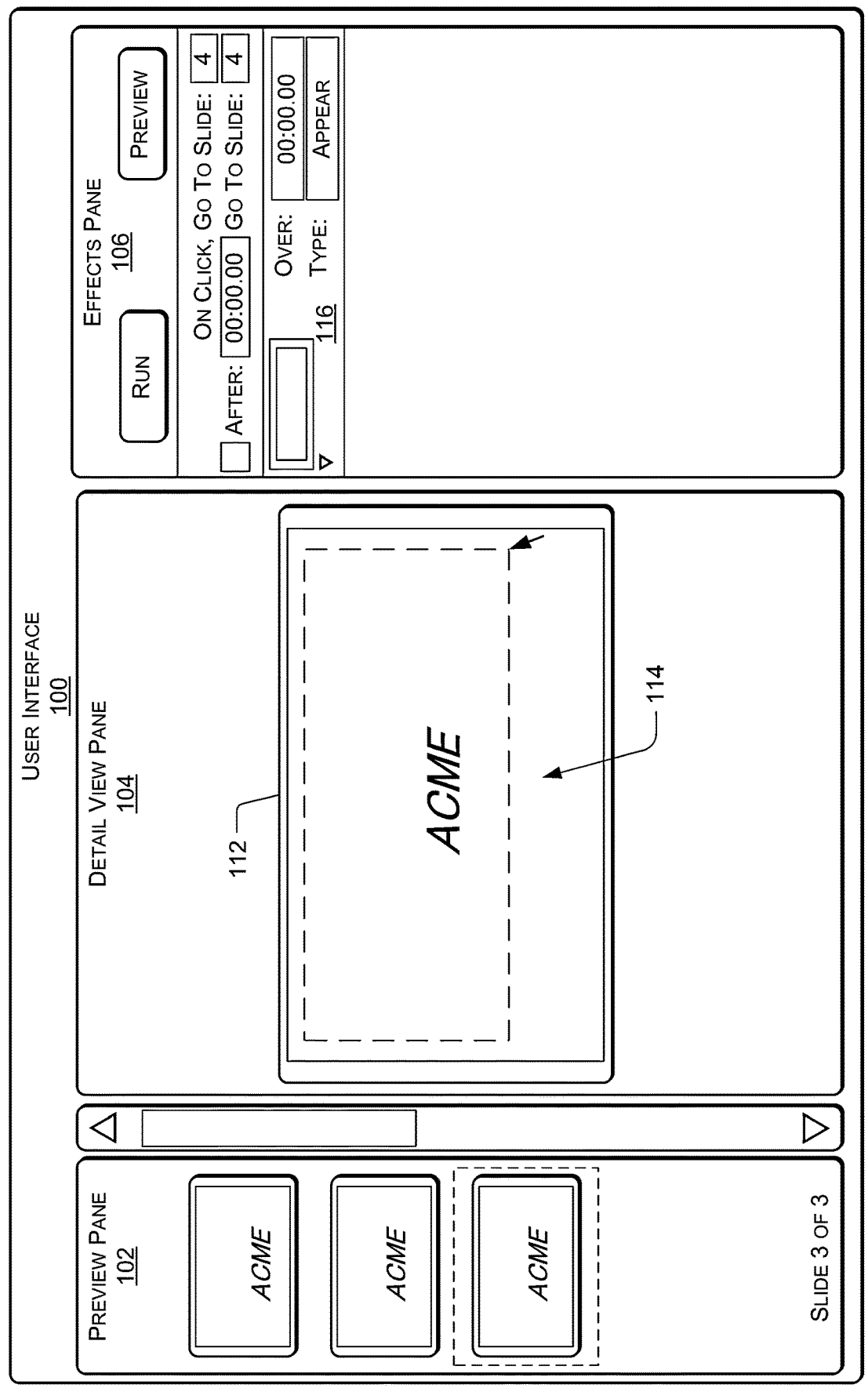
Figure 7:
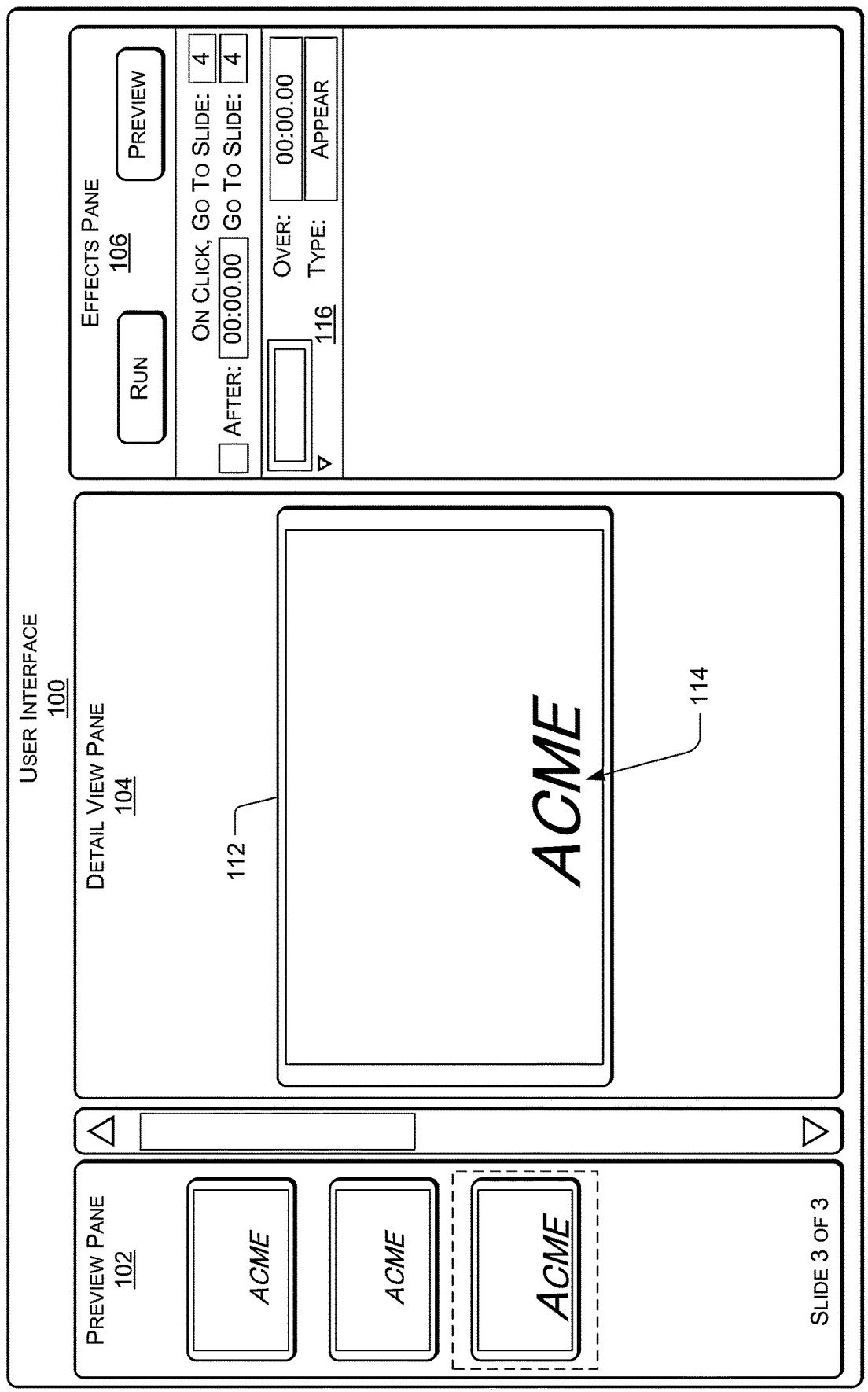

FIG. 6 illustrates that the user may resize, reorient, or otherwise manipulate the first shape 114 on the third slide 112. FIG. 7 illustrates the result of the resizing of the first shape 114 on the third slide 112 in FIG. 6. For example, as shown in the preview pane 102 and the detail view pane 104 of FIG. 7, the first shape 114 has been enlarged and shifted down with respect to the second slide 110.

Figure 8:
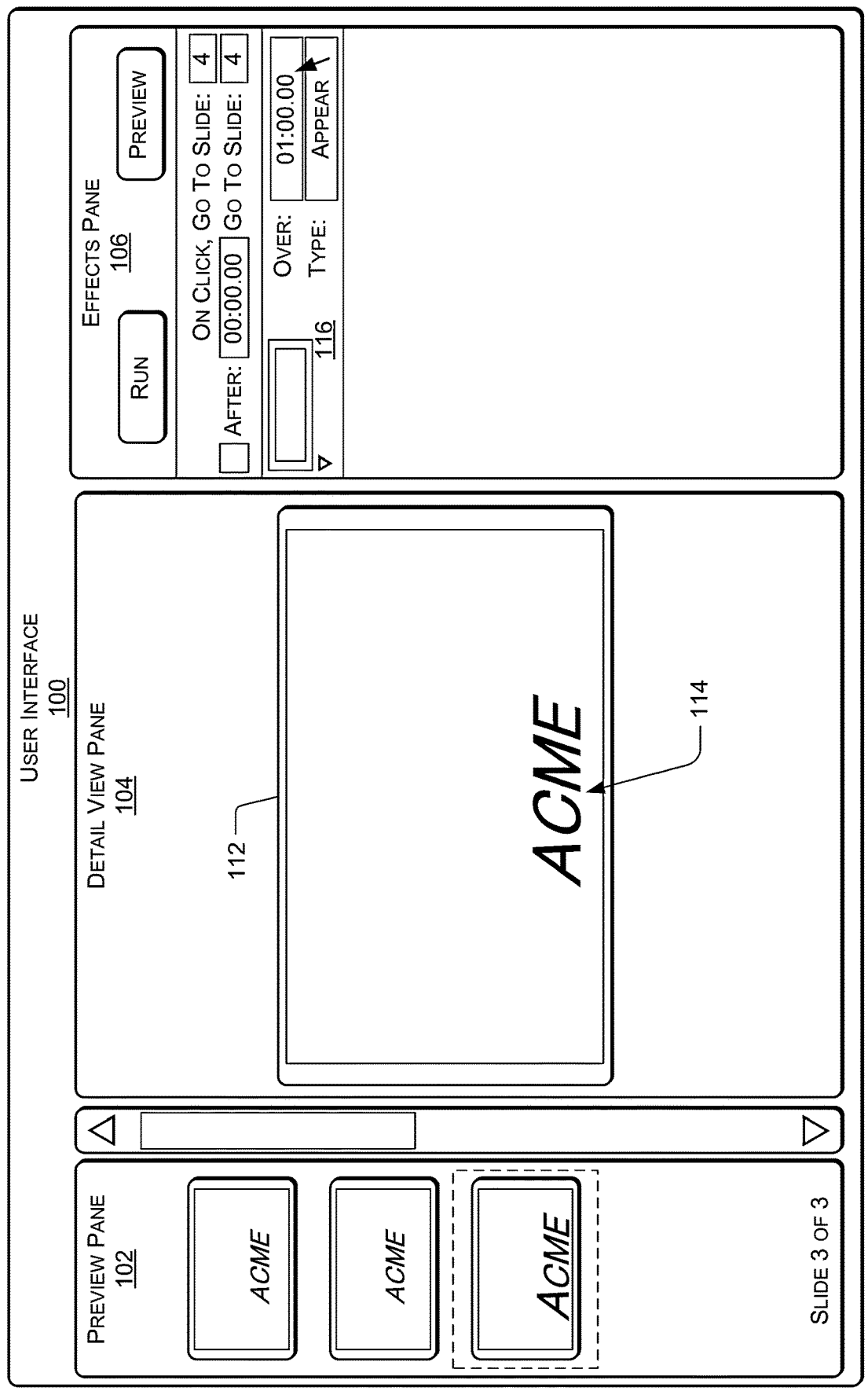

FIG. 8 illustrates that the user may adjust the default time period for the first shape 114 to enter and transform as well as to transform and exit (e.g., from one second to one minute).

Figure 9:
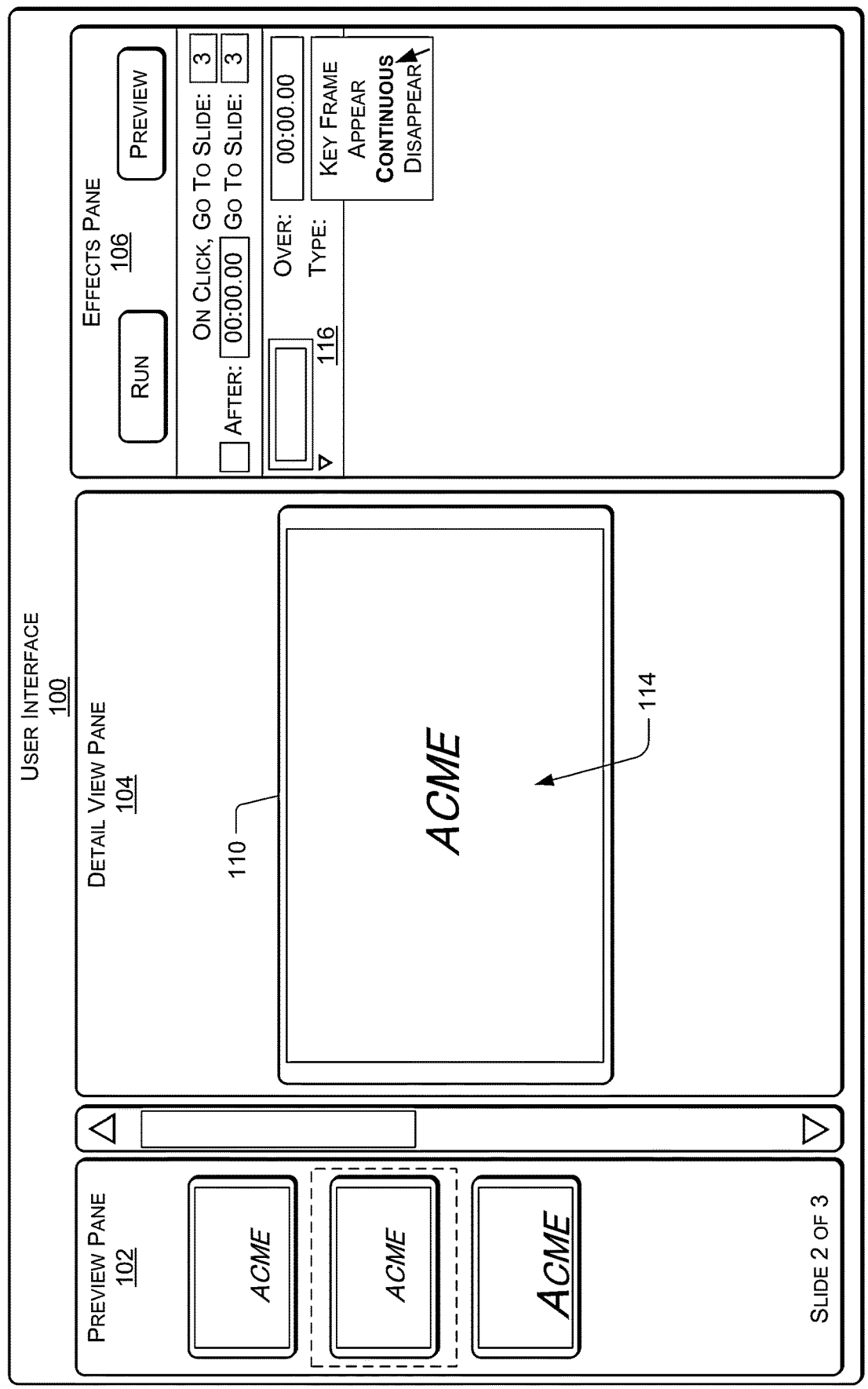

Referring to FIG. 9, the user may select the second slide 110 in the preview pane 102 to display the second slide 110 in the detail view pane 104. The user may change the type of the first shape 114 to "Continuous" via the effects pane 106. For example, in the example of FIG. 9, the user may select the "Continuous" type from a pull-down menu of different shape behavior types.

Figure 10:
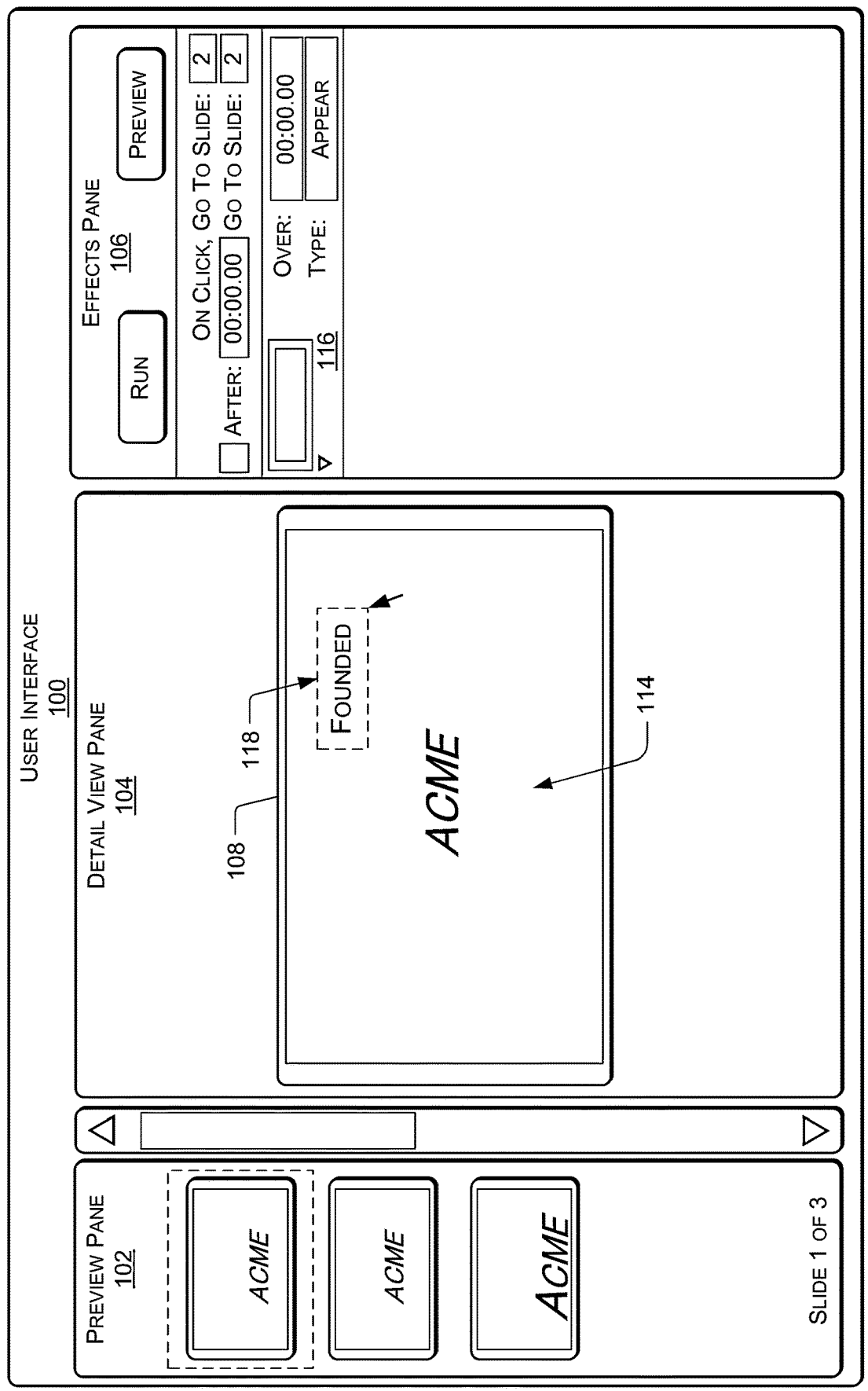
Figure 11:
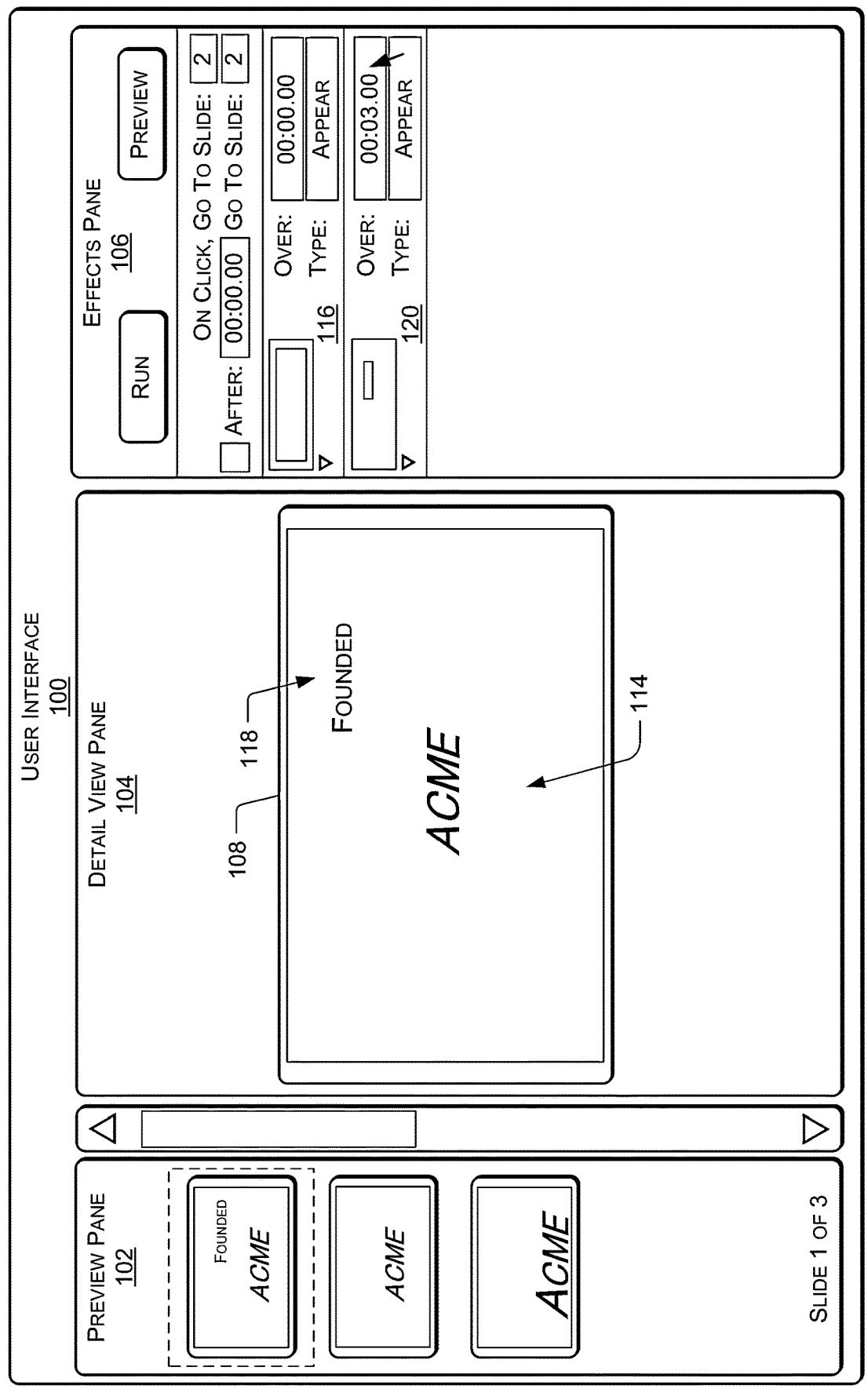
Figure 21:
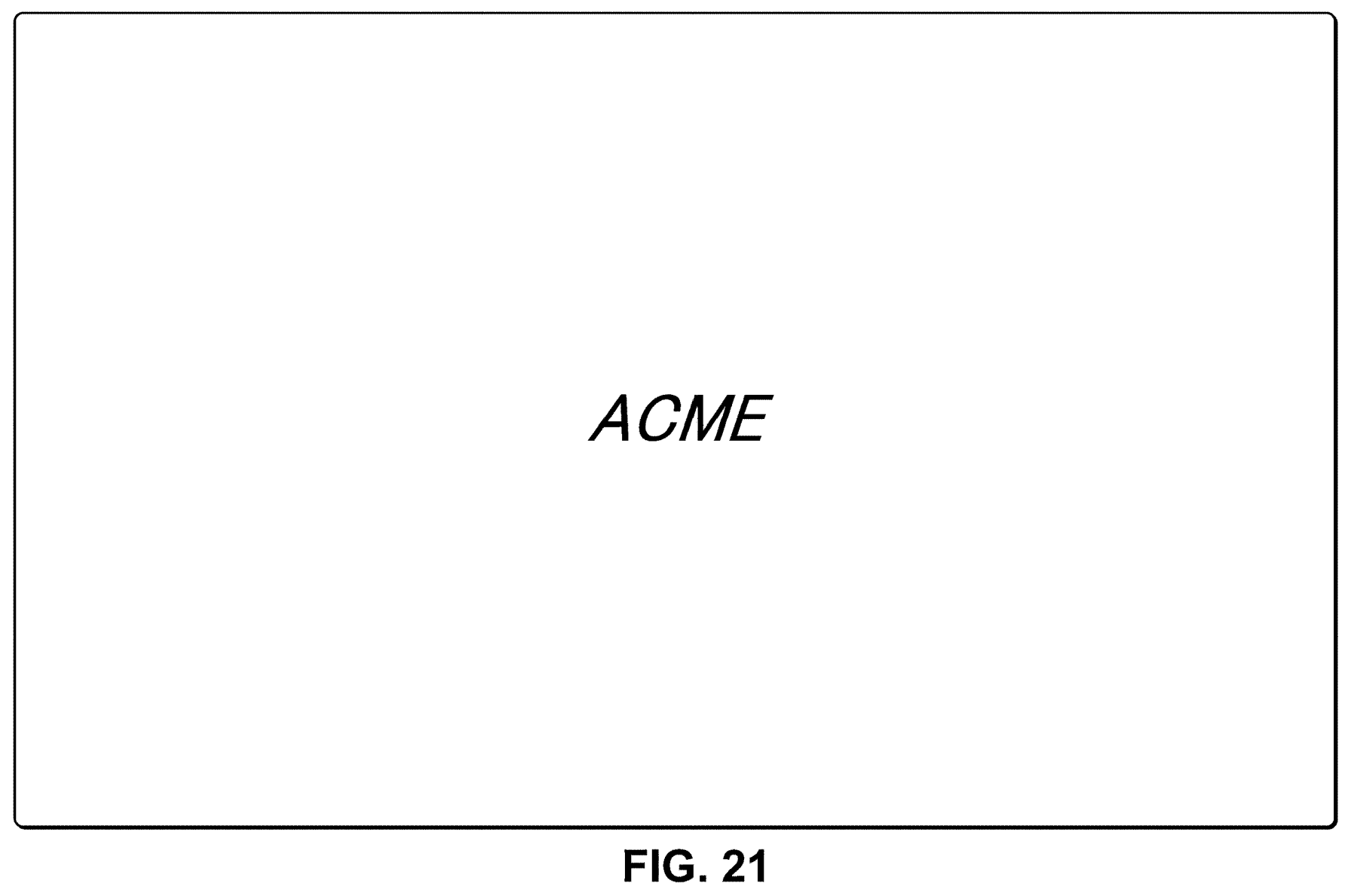
Figure 22:
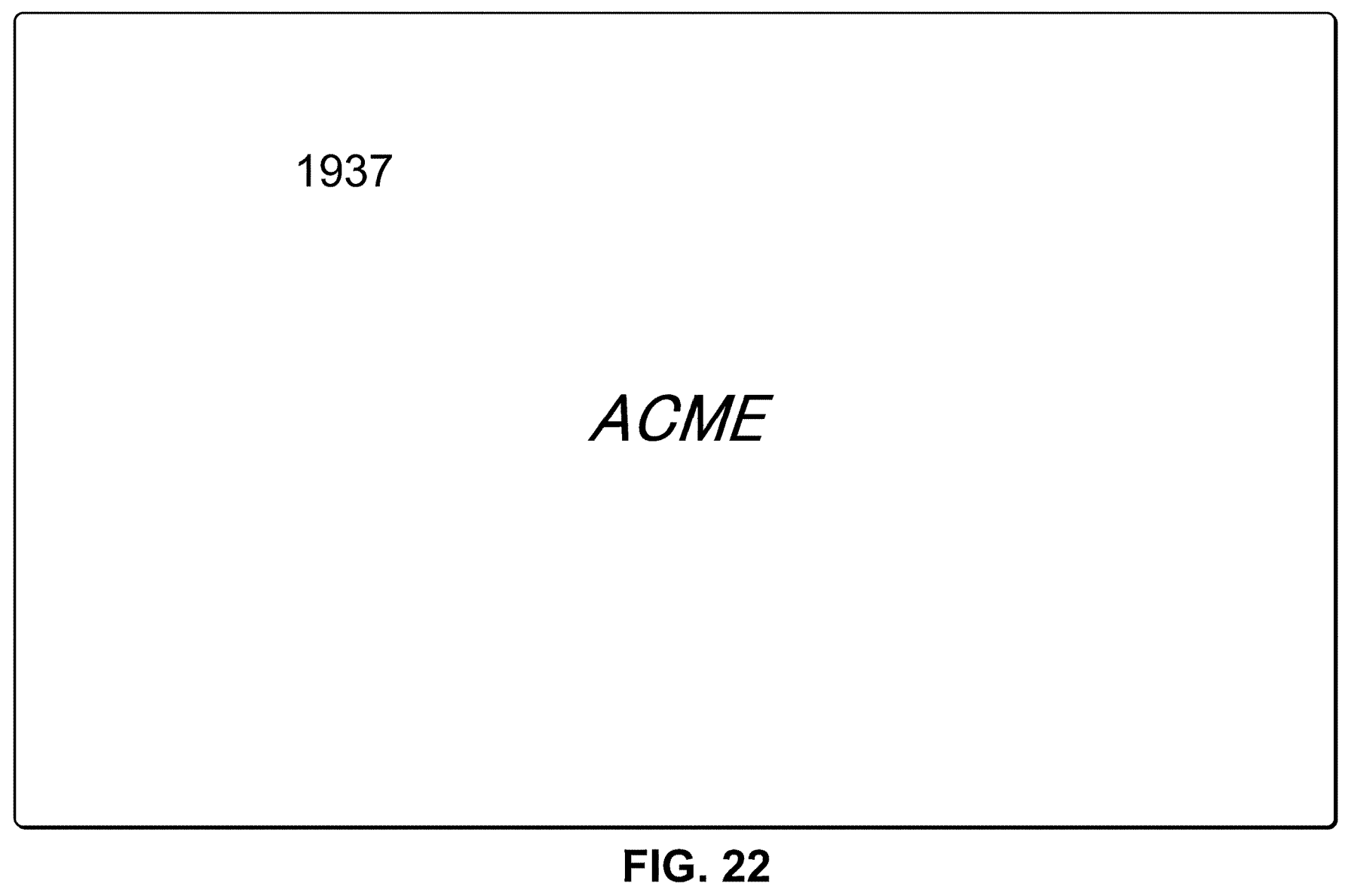
Figure 23:

FIG. 10 illustrates that the user may select the first slide 108 to add another shape (e.g., the second shape 118) to the first slide 108, and FIG. 11 illustrates that the second shape 118 has been added to the first slide 108 and the second shape thread 120 has been added to the effects pane 106. FIG. 11 further illustrates that the type of the second shape 118 is set to "Appear" as this is the first instance of the second shape 118 in the presentation. The "Over" time may represent the time period for the second shape 118 to appear on the first slide 108 after the initiation of the presentation. That is, the user may define a delay before the second shape 118 is to be displayed on the first slide 108. FIG. 11 further illustrates that the user may adjust a default time period for the second shape 118 to appear (e.g., to three seconds). That is, as illustrated in the effects pane 106, the first shape 114 may be set to appear when the first slide 108 has been selected (e.g., after zero seconds), while the second shape 118 may be set to appear after a delay of three seconds. Thus, the user interface 100 may allow the user to independently manage the "intra-slide" visual effects (e.g., the time for a shape to appear on a particular slide) of each shape independently. FIGS. 21-23 described below illustrate that the first shape 114 (e.g., the company logo "Acme") may appear before the second shape 118.

Figure 12:
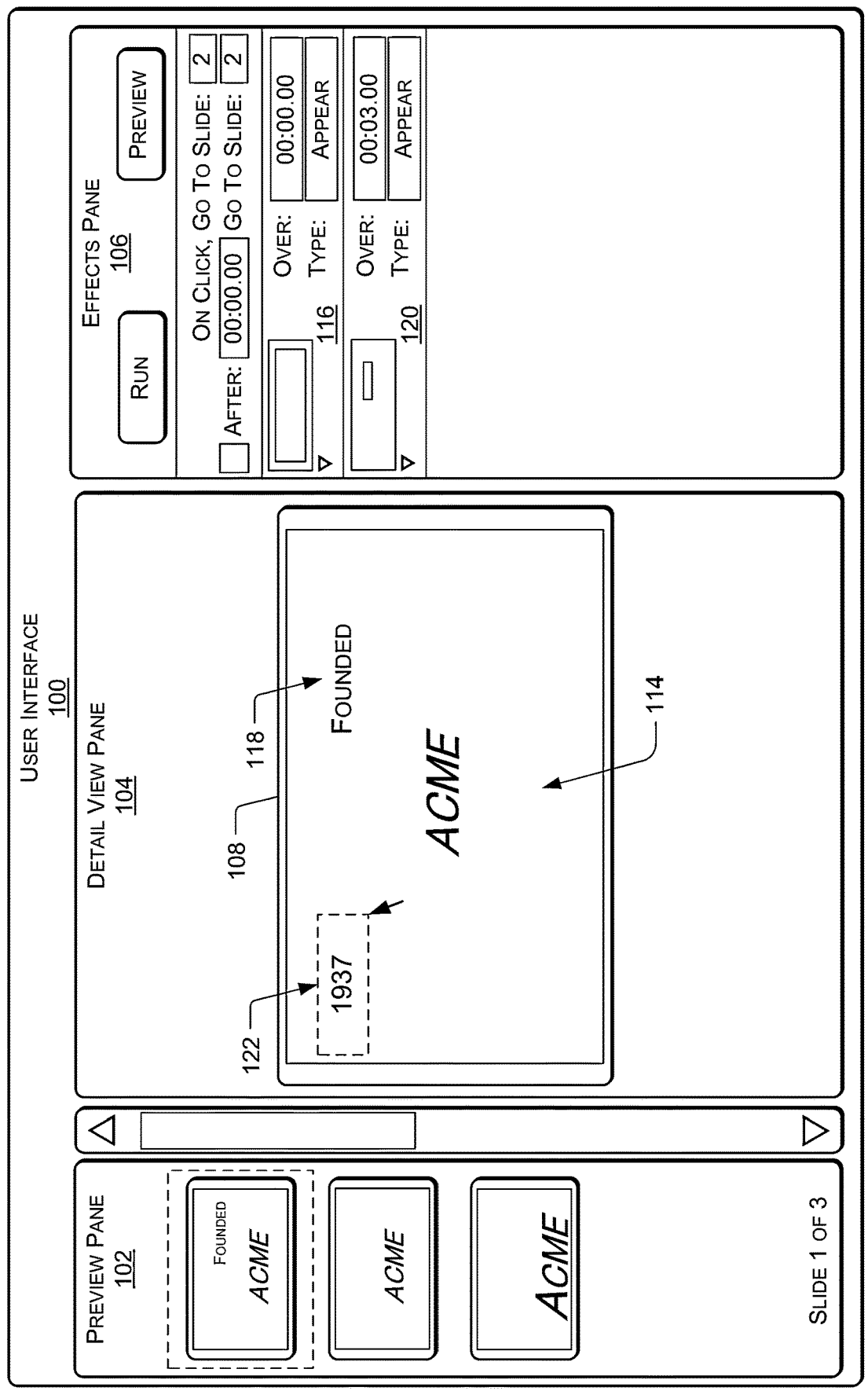
Figure 13:
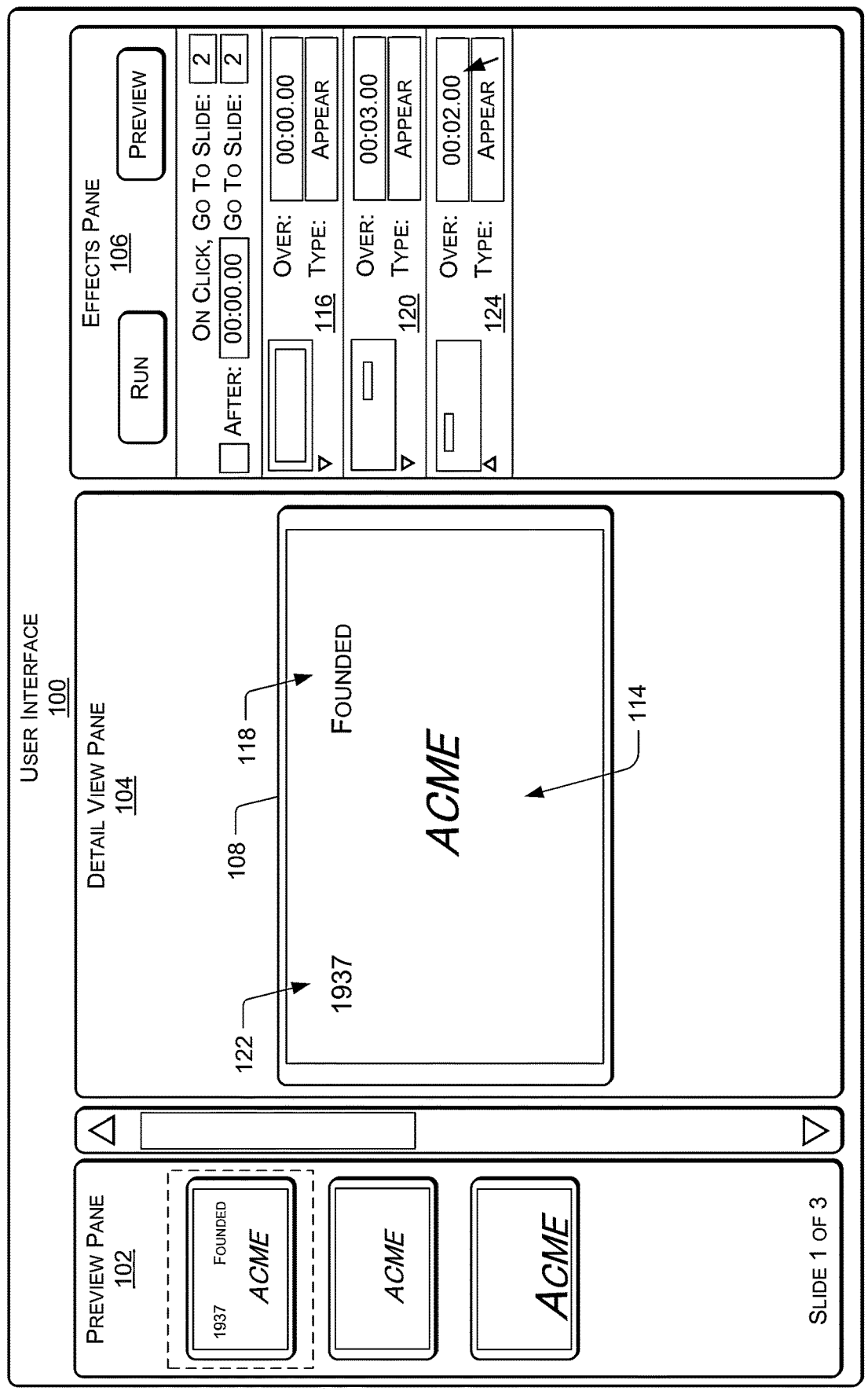

FIG. 12 illustrates that the user may add another shape (e.g., the third shape 122) to the first slide 108, and FIG. 13 illustrates that the third shape 122 has been added to the first slide 108 and the third shape thread 124 has been added to the effects pane 106. FIG. 13 further illustrates that the type of the third shape 122 is set to "Appear," as this is the first instance of the third shape 122 in the presentation. The "Over" time may represent the time period for the third shape 122 to appear after the initiation of the presentation. That is, the user may define a delay before the third shape 122 is to be displayed on the first slide 108. FIG. 13 illustrates that the user may adjust the default time period for the third shape 122 to appear (e.g., to two seconds). That is, the first shape 114 may appear upon presentation of the first slide 108 (e.g., after zero seconds), the third shape 122 may appear after a delay of two seconds, and the second shape 118 may appear after a delay of three seconds. Thus, the user interface 100 may allow the user to better manage intra-slide continuity using different delay times for various shapes to appear on a particular slide. FIGS. 21-23 described below illustrate that the first shape 114 (e.g., the company logo "Acme") may appear before the third shape 122 (e.g., upon initiation of the presentation), the third shape 122 (e.g., the year 1937) may appear after the first shape 114 (e.g., after two seconds), and the second shape 118 (e.g., the text "Founded") may appear after the third shape 122 (e.g., after three seconds).

Figure 14:
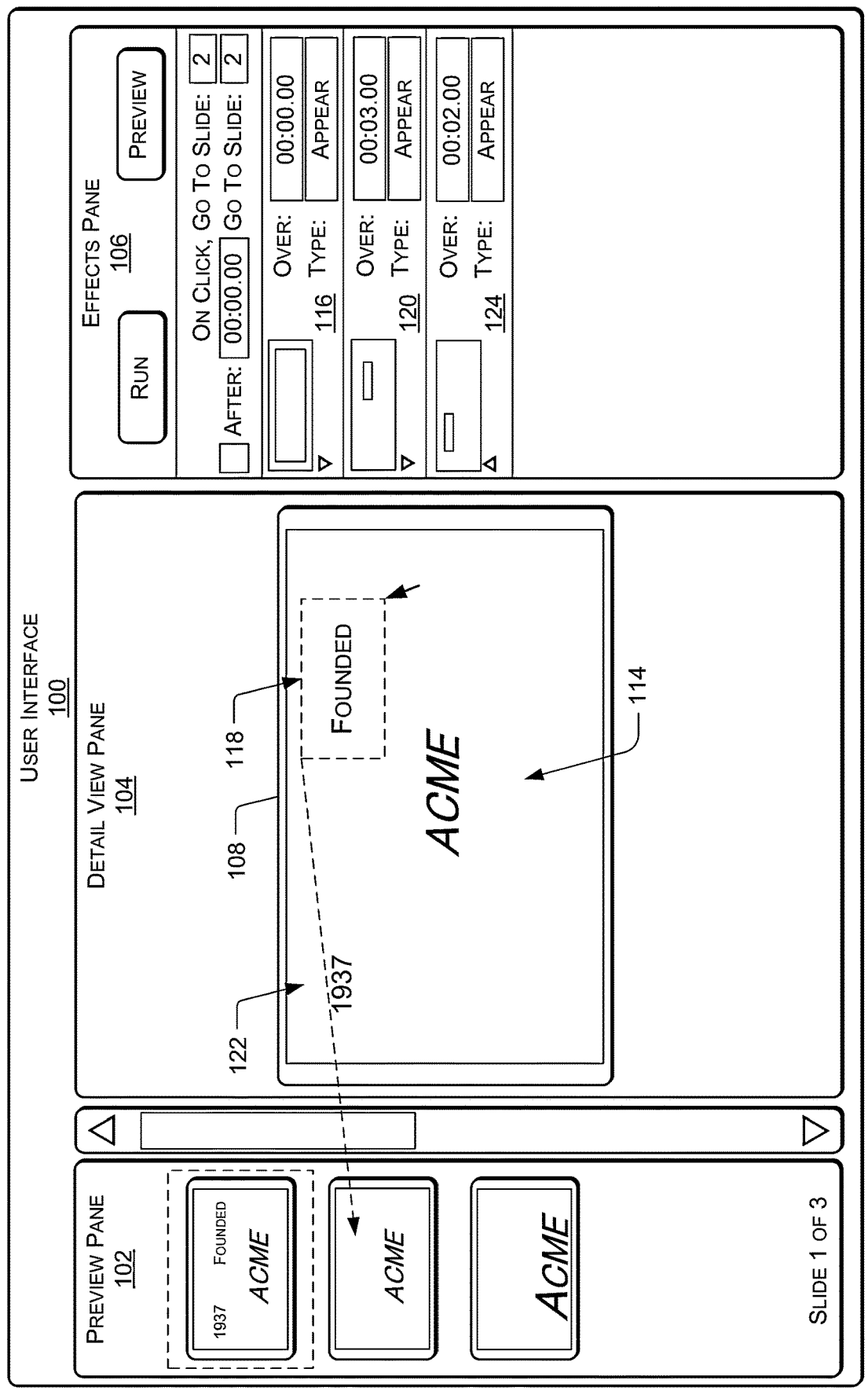
Figure 15:
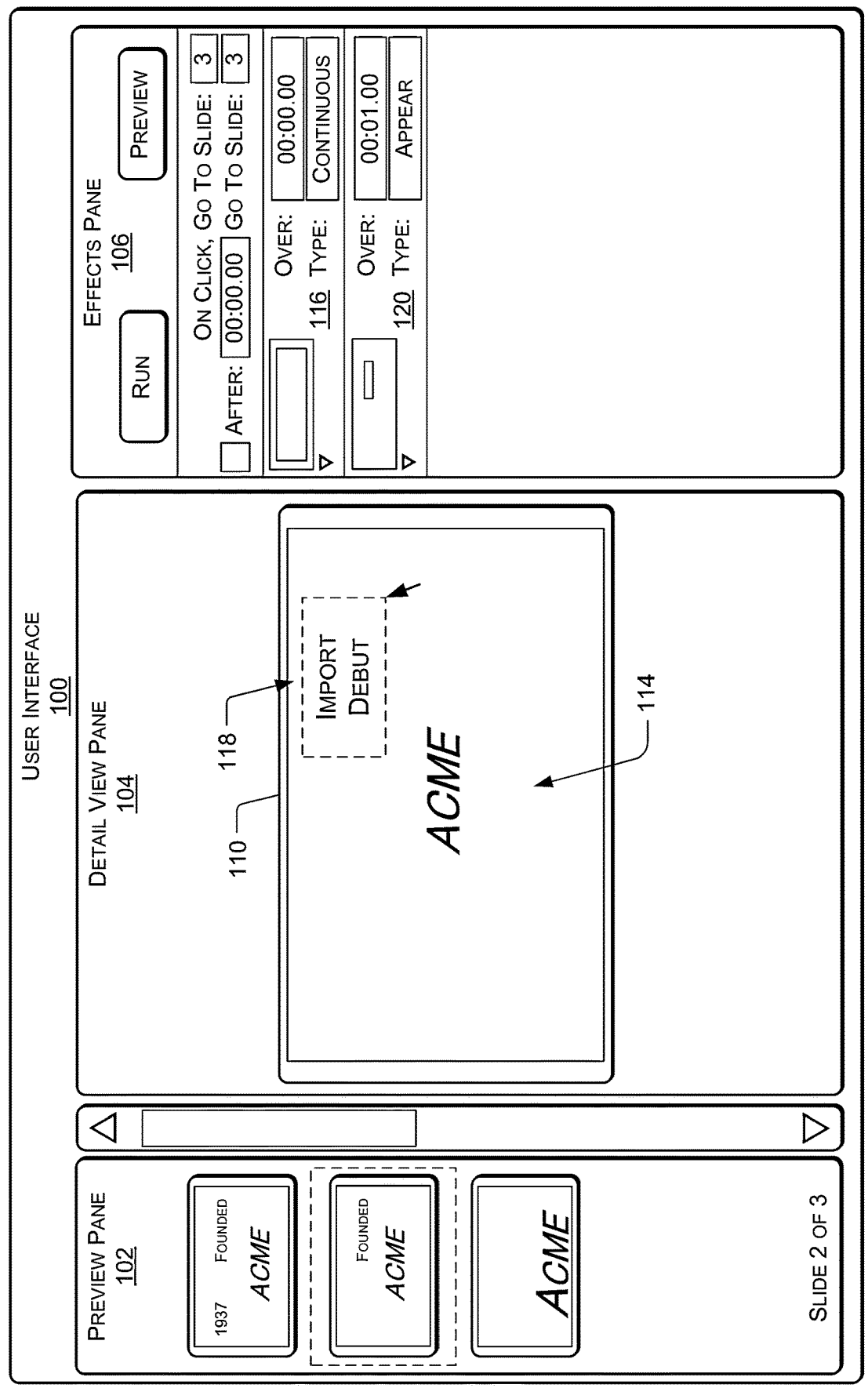

FIG. 14 illustrates one example of the user adding the second shape 118 to the second slide 110 by dragging and dropping the second shape 118 displayed in the detail view pane 104 for the first slide 108 onto the second slide 110 displayed in the preview pane 102. FIG. 15 illustrates that the second shape 118 has been added to the second slide 110 and the second shape thread 120 has been added to the effects pane 106 for the second slide 110. FIG. 15 further illustrates that the type of the second shape 118 is set to "Appear" on the second slide 110. The "Over" time may represent the time over which one or more attribute values of the second shape 118 transition from the associated attribute values on a previous slide (e.g., the first slide 108) upon the user advancing to the second slide 110.

Figure 16:
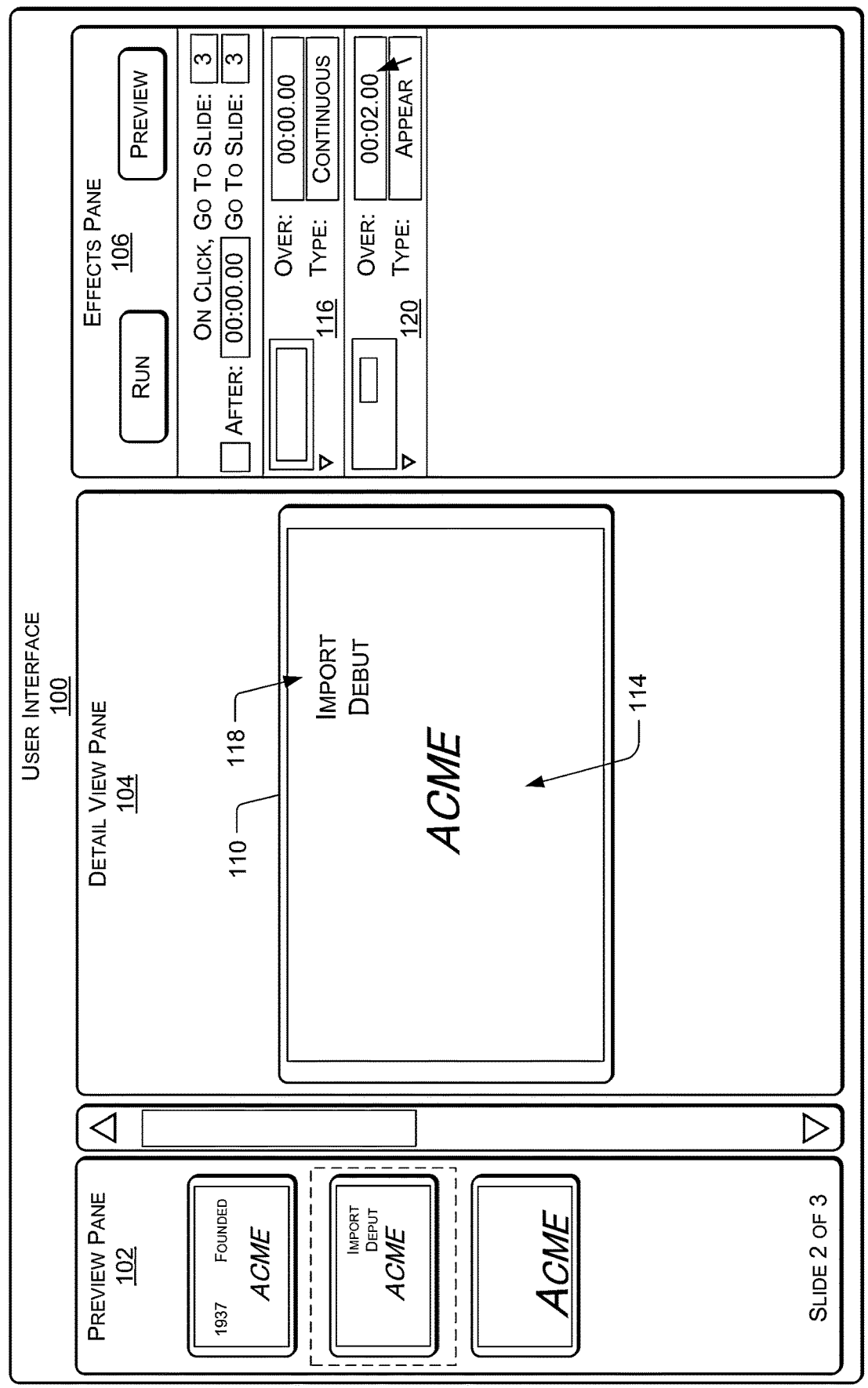

FIG. 15 further illustrates that the user may edit the text of the second shape 118 from "Founded" to "Import Debut," and FIG. 16 illustrates the updated text in the detail view pane 104 and the preview pane 102 for the second slide 110. FIG. 16 further illustrates that the user may adjust the default time period for the second shape 118 to appear (e.g., to two seconds).

Figure 17:
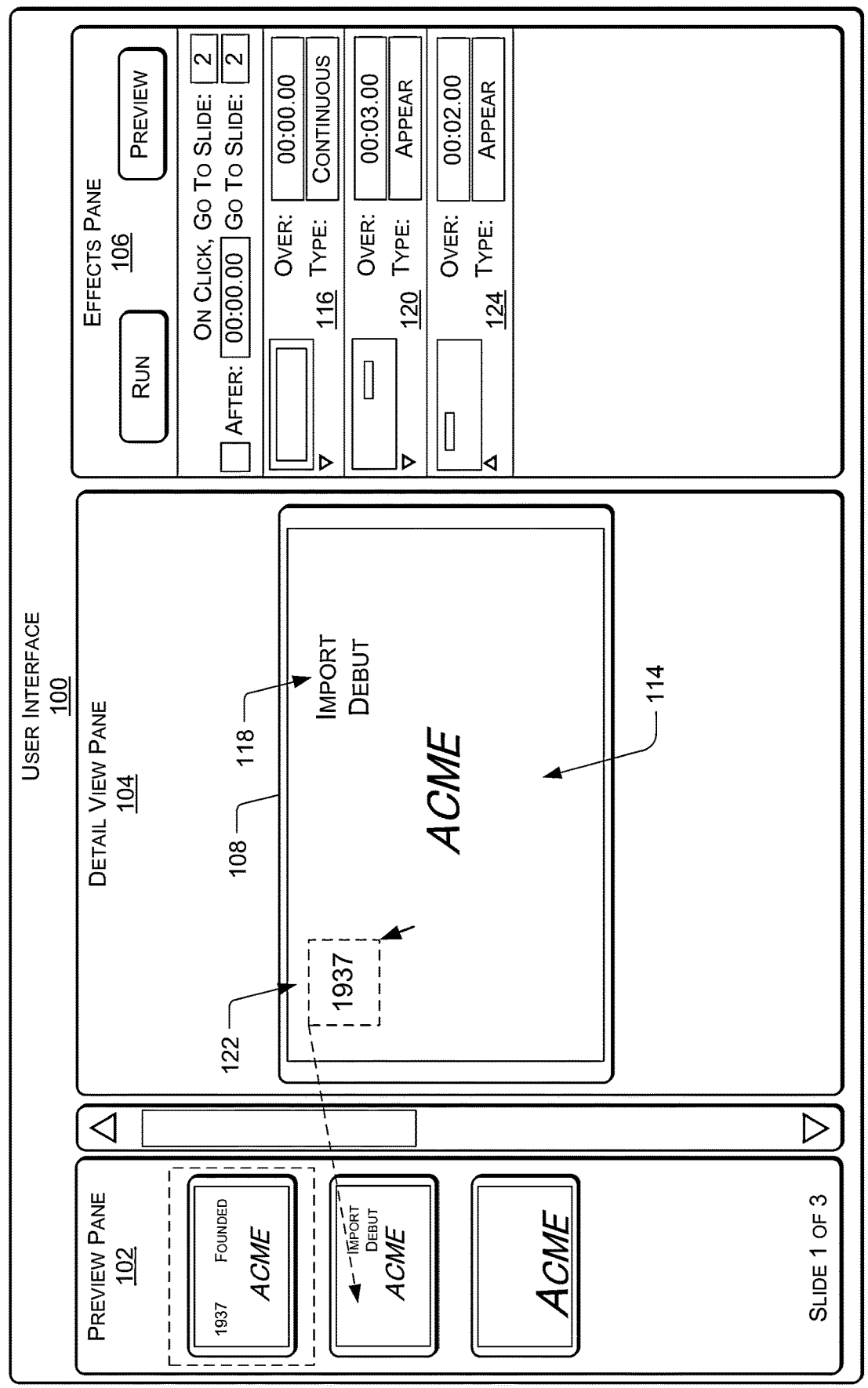
Figure 18:
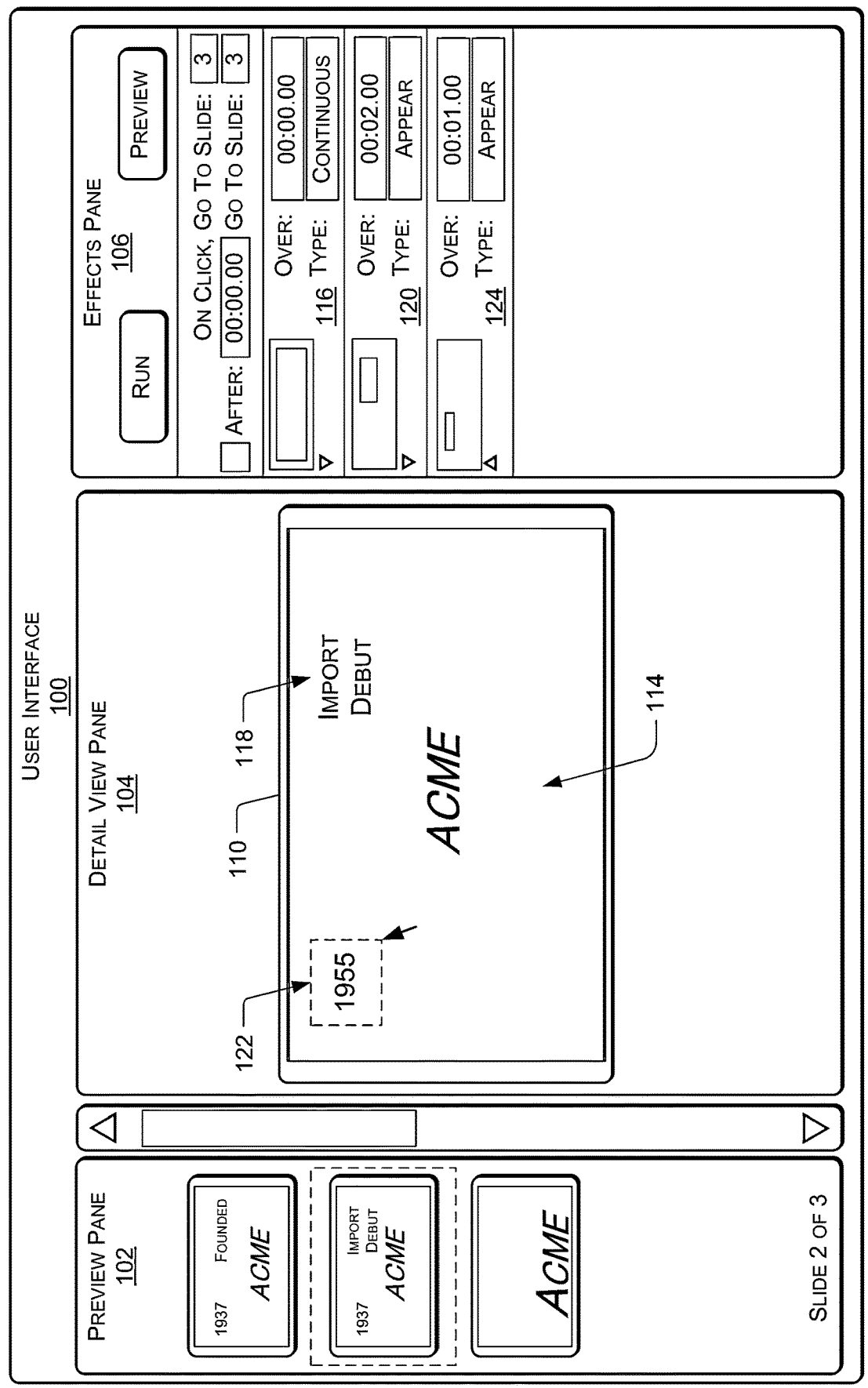

FIG. 17 illustrates one example of the user adding the third shape 122 to the second slide 110 by dragging and dropping the third shape 122 displayed in the detail view pane 104 for the first slide 108 onto the second slide 110 displayed in the preview pane 102. FIG. 18 illustrates that the third shape 122 has been added to the second slide 110 and the third shape thread 124 has been added to the effects pane 106 for the second slide 110. FIG. 18 further illustrates that the type of the third shape 122 is set to "Appear." The "Over" time may represent the time period over which one or more attribute values of the third shape 122 transition from the associated attribute values on the previous slide (e.g., the first slide 108) upon the user advancing to the second slide 110.

Figure 19:
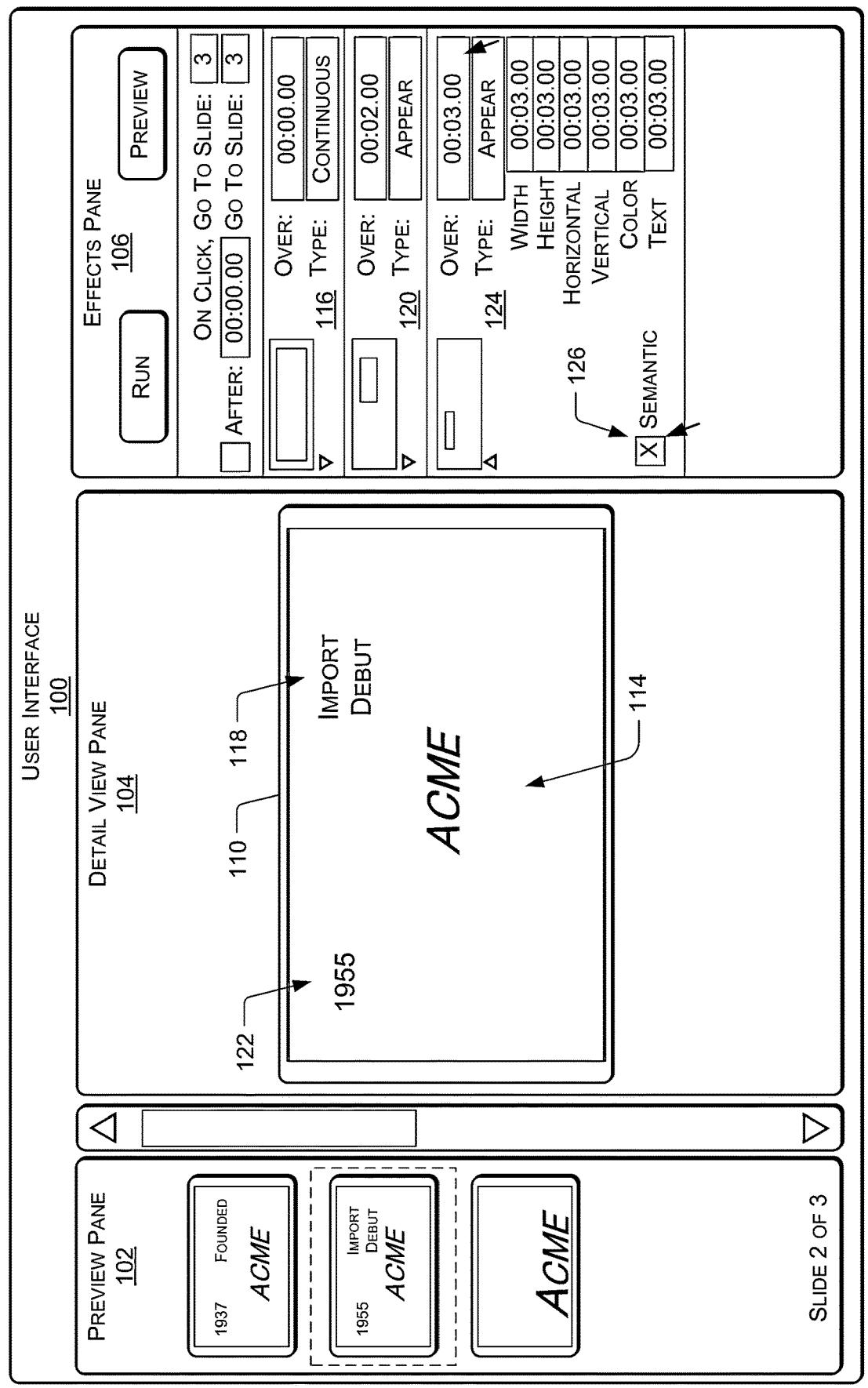

FIG. 18 further illustrates that the user may edit the numerical year of the third shape 122 from "1937" to "1955," and FIG. 19 illustrates the updated year in the detail view pane 104 and the preview pane 102 for the second slide 110. FIG. 19 further illustrates that the user may adjust the default time period for the third shape 122 to appear on the second slide 110 (e.g., to three seconds). In some implementations, the second shape 118 and the third shape 122 disappear at the same time upon advancing from the second slide 110 to the third slide 112. However, FIGS. 28 and 29 described below illustrate that the second shape 118 (e.g., "Import Debut") and the third shape 122 (e.g., "1955") may disappear at different times upon transitioning from the second slide 110 to the third slide 112. For example, the second shape 118 may disappear after two seconds, while the third shape 122 may disappear after three seconds. Thus, the user interface 100 may allow the user to independently manage not only the time for each shape to appear but also the time for each shape to disappear.

FIG. 19 further illustrates that the user may select the semantic attribute icon 126. For example, FIGS. 23-26 described below illustrate an example of semantic interpolation in which the third shape 122 interpolates from the year 1937 to the year 1955 as the presentation transitions from the first slide 108 to the second slide 110. Further, FIGS. 23-26 illustrate that the second shape 118 transitions from "Founded" to "Import Debut" while the presentation transitions from the first slide 108 to the second slide 110.

Figure 20:
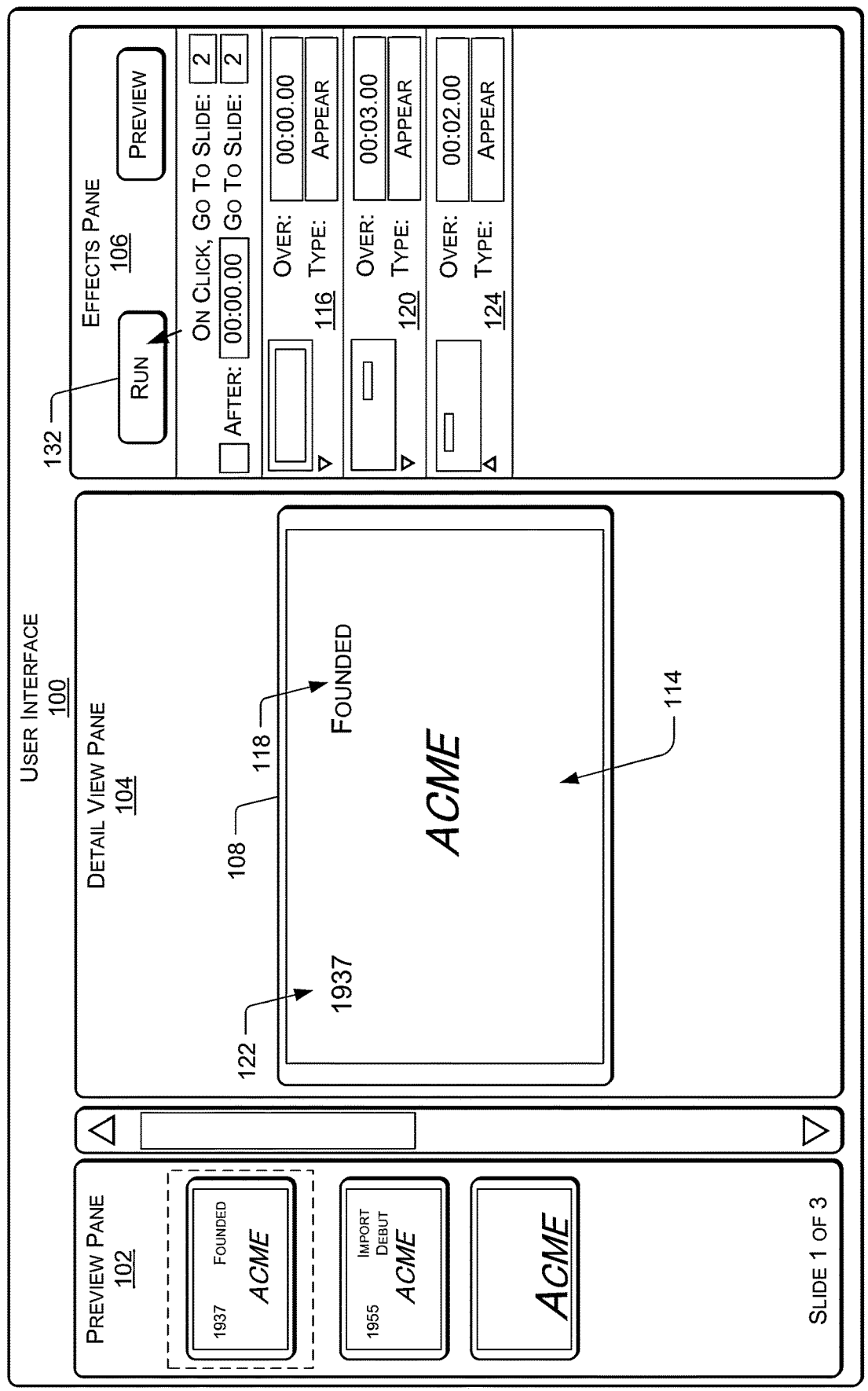

FIG. 20 illustrates that the user may select the Run icon 132 to initiate the presentation, and FIG. 21 illustrates the first slide 108 of the presentation after the first shape 114 has appeared. FIG. 21 illustrates that the size and position of the first shape 114 (e.g., the company logo "Acme") corresponds to the initial size and position of the first shape 114 on the first slide 108. As the type of the first shape 114 is set to "Continuous," the size and position of the first shape 114 may gradually transition (e.g., over a period of one minute, as defined by the user in FIG. 8) from the initial state on the first slide 108 to the target state on the third slide 112. This gradual transition may occur independently of any user action with respect to the presentation. That is, the user may remain on a particular slide for a period of time that is appropriate for the delivery of the presentation, while the background image of the "Acme" company logo may transition independently over the user-defined time period (e.g., over a time period of one minute in this example). This independent transition may improve inter-slide continuity.

FIG. 22 illustrates that the third shape 122 (e.g., the year 1937) may appear on the first slide 108 after the first shape 114. For example, as described with respect to FIG. 13, the user may define the time for the third shape 122 to appear on the first slide 108 as two seconds. FIG. 23 illustrates that the second shape 118 (e.g., the text "Founded") may appear on the first slide 108 after the third shape 122. For example, as described with respect to FIG. 11, the user may define the time for the second shape 118 to appear on the first slide 108 as three seconds. Thus, FIGS. 21-23 illustrate the intra-slide behavior of the shapes 114, 118, and 122 on the first slide 108 as defined by the user in the user interface 100.

Figure 24:
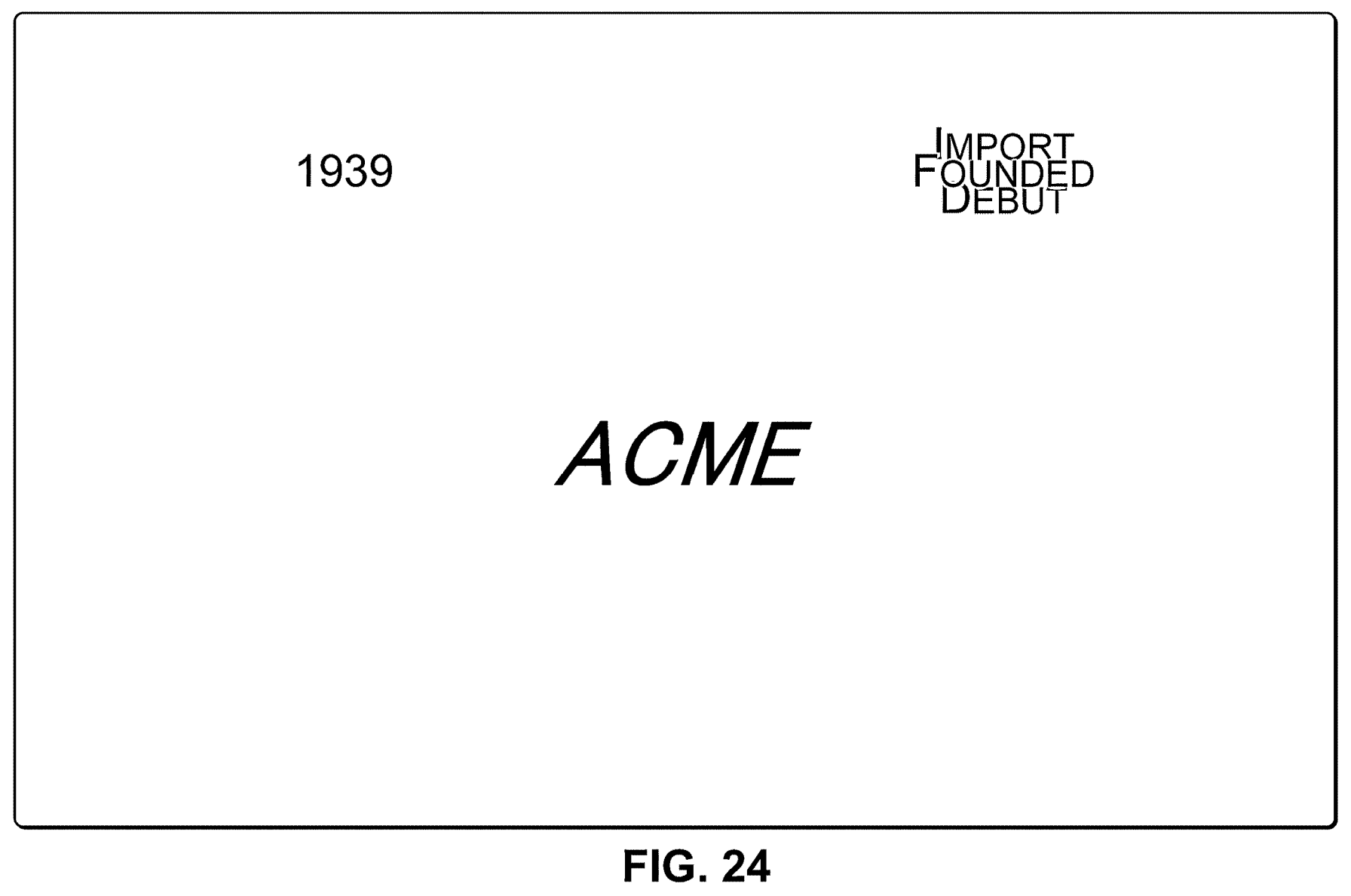

Referring to FIG. 23, the user may click on the first slide 108 or otherwise select to transition from the first slide 108 to the second slide 110. FIG. 24 illustrates an example of the transition from the first slide 108 to the second slide 110 in accordance with the shape threads 116, 120, and 124 as defined by the user via the user interface 100.

Referring to FIG. 24, the second shape 118 and the third shape 122 begin transitioning to the target state corresponding to the second slide 110. For example, the second shape 118 begins transitioning from the text "Founded" in first slide 108 to the text "Import Debut" in the second slide 110 over a time period of two seconds (as defined by the user in FIG. 13). FIG. 24 illustrates one example of the transition with the text "Founded" fading out while the text "Import Debut" fades in. FIG. 24 further illustrates that the third shape 122 begins the semantic transition from the year 1937 in the first slide 108 to the year 1955 in the second slide 110 over a time period of three seconds (as defined by the user in FIG. 11). In FIG. 24, the year 1939 is illustrated as the value for the third shape 122, representing a semantic transition of two years from the initial year of 1937 on the first slide 108 to the target year of 1955 on the second slide 110. However, it will be appreciated that this is for illustrative purposes only.

Figure 25:
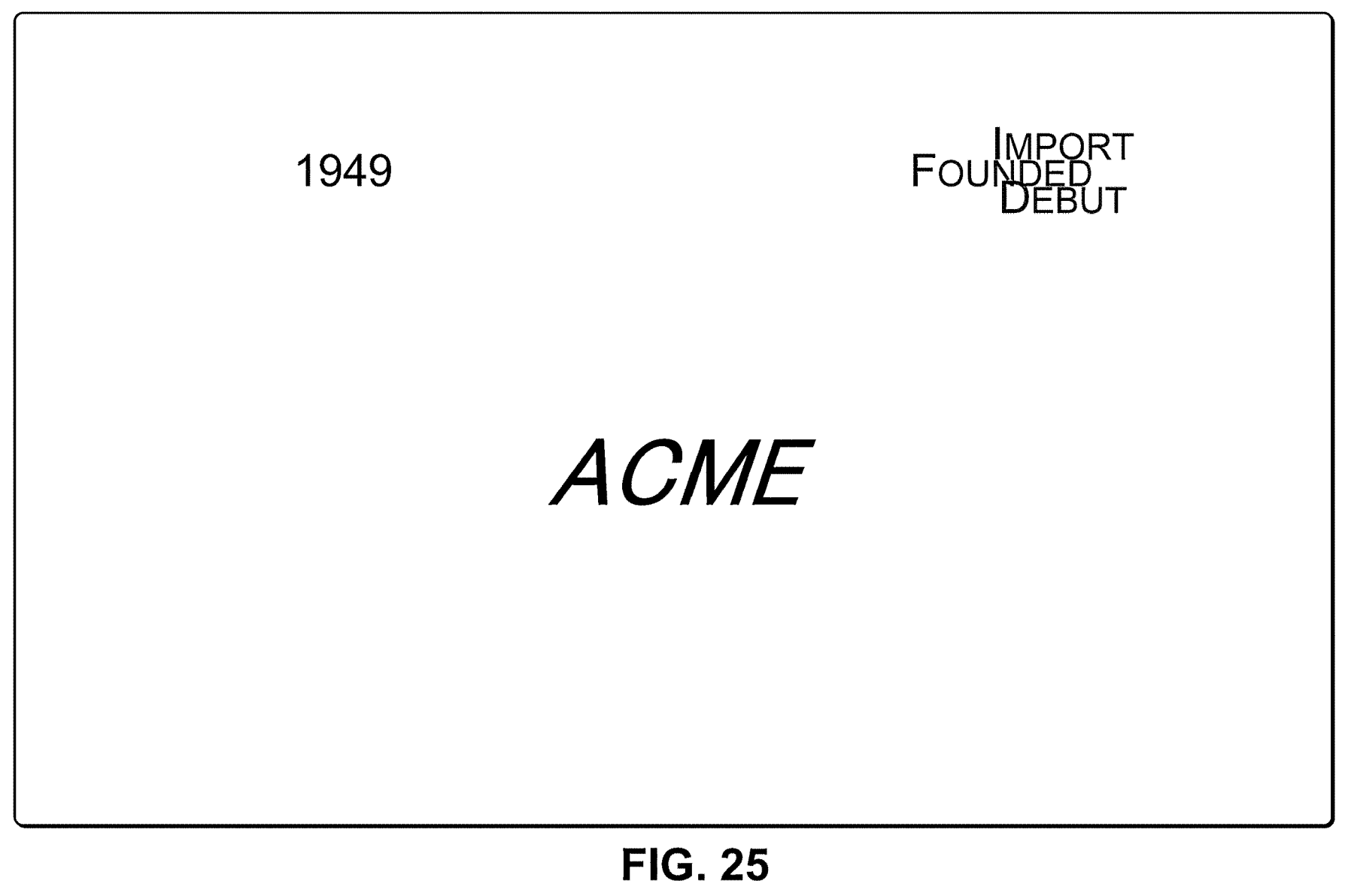

FIG. 25 illustrates a continuation of the transition of the second shape 118 and the third shape 122. In FIG. 25, the second shape 118 continues transitioning from the text "Founded" to the text "Import Debut," while the third shape 122 continues the semantic transition from the year 1937 to the year 1955. In FIG. 25, the year 1949 is illustrated as the value for the third shape 122, representing a semantic transition of ten years from the year 1939 in FIG. 24. However, it will be appreciated that this is for illustrative purposes only.

Figure 26:
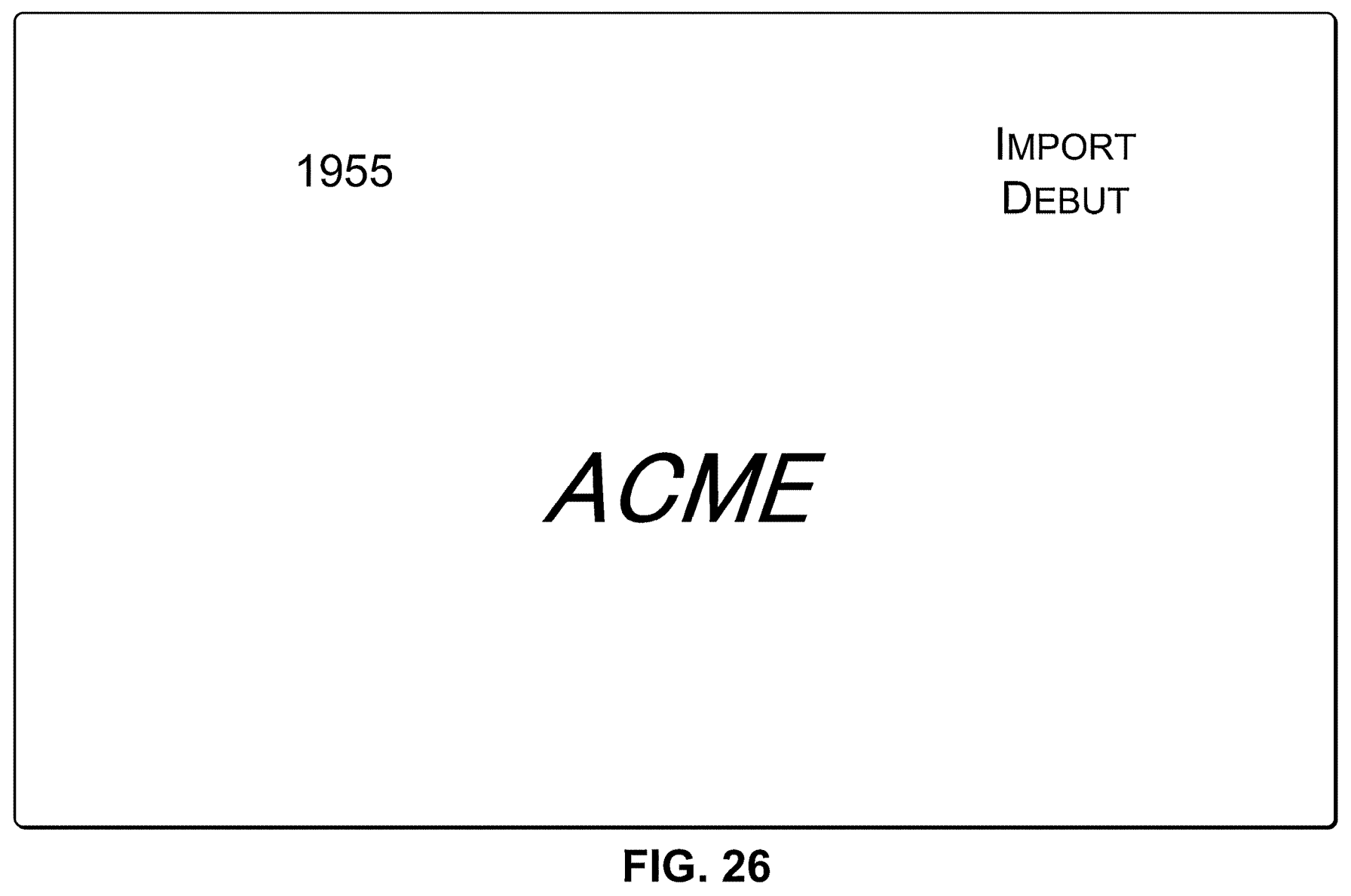

FIG. 26 illustrates the second slide 110 upon completion of the transition. That is, the second shape 118 has completed the transition from the text "Founded" to the text "Import Debut," while the third shape 122 has completed the semantic transition to the year 1955.

Figure 27:

FIGS. 21-26 further illustrate that the first shape 114 with a "Continuous" effect type continues the interpolation from the initial state on the first slide 108 to the target state on the third slide 112 over the time period of one minute as specified by the user (as illustrated in FIG. 11), independent of the actions of the presenter during the presentation. Referring to FIG. 27, the size and position of the first shape 114 has further changed with respect to the size and position of the first shape 114 in FIG. 26. The degree of size and position transition may correspond to an amount of time between the completion of the transition in FIG. 26 and the presenter clicking on the second slide 110 in FIG. 27 to advance to the third slide 112. In the event that the amount of time that has elapsed between the initial appearance of the first shape 114 on the first slide 108 has reached the time specified for the first shape 114 to complete the transition to the target state on the third slide 112 (e.g., one minute), the transition of size and position of the first shape 114 may end at the target state identified in the third slide 112, even though the presenter has not yet reached the third slide 112.

Figure 28:
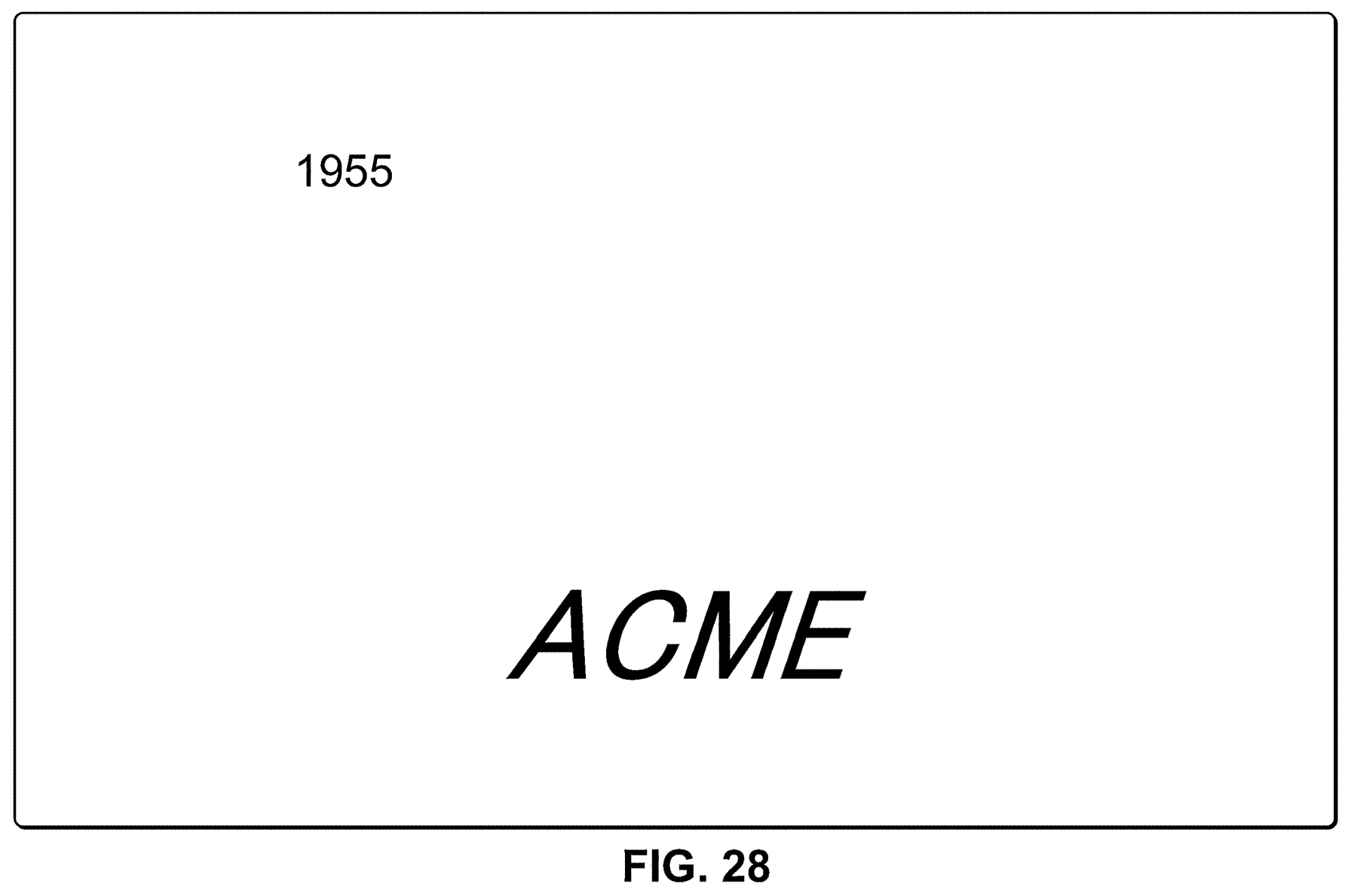
Figure 29:
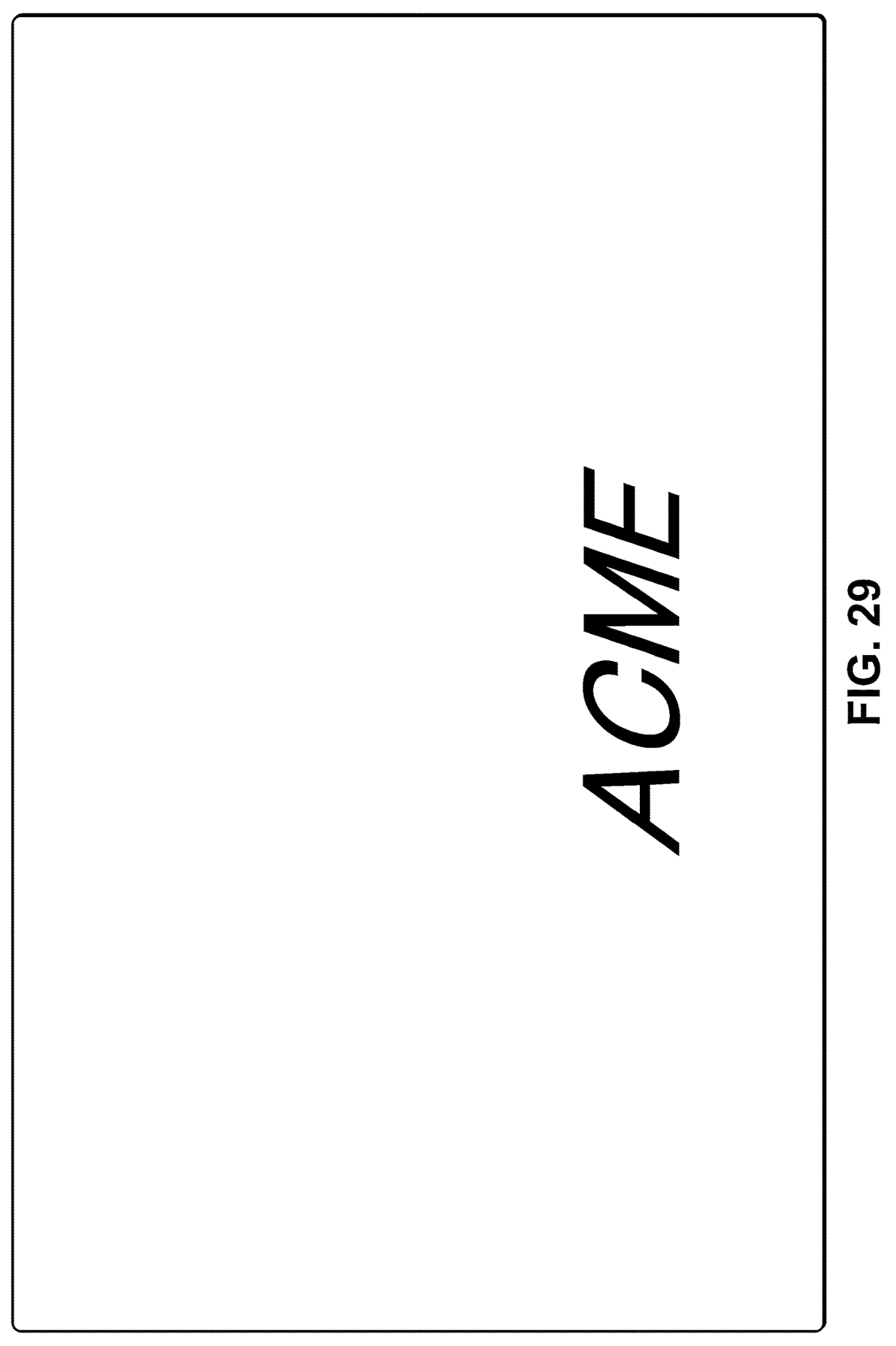

In some implementations, the second shape 118 and the third shape 122 disappear at the same time when advancing to the third slide 112. However, FIGS. 28 and 29 illustrate an alternative transition from the second slide 110 to the third slide 112 in response to the user advancing from the second slide 110 to the third slide 112 (e.g., by clicking on the second slide 110 in FIG. 27). FIGS. 28 and 29 illustrate an example in which the second shape 118 (e.g., "Import Debut") and the third shape 122 (e.g., the year "1955") disappear at different times during the transition from the second slide 110 to the third slide 112. For example, the second shape 118 may disappear after two seconds, while the third shape 122 may disappear after three seconds as illustrated in FIG. 29.

Figure 30:
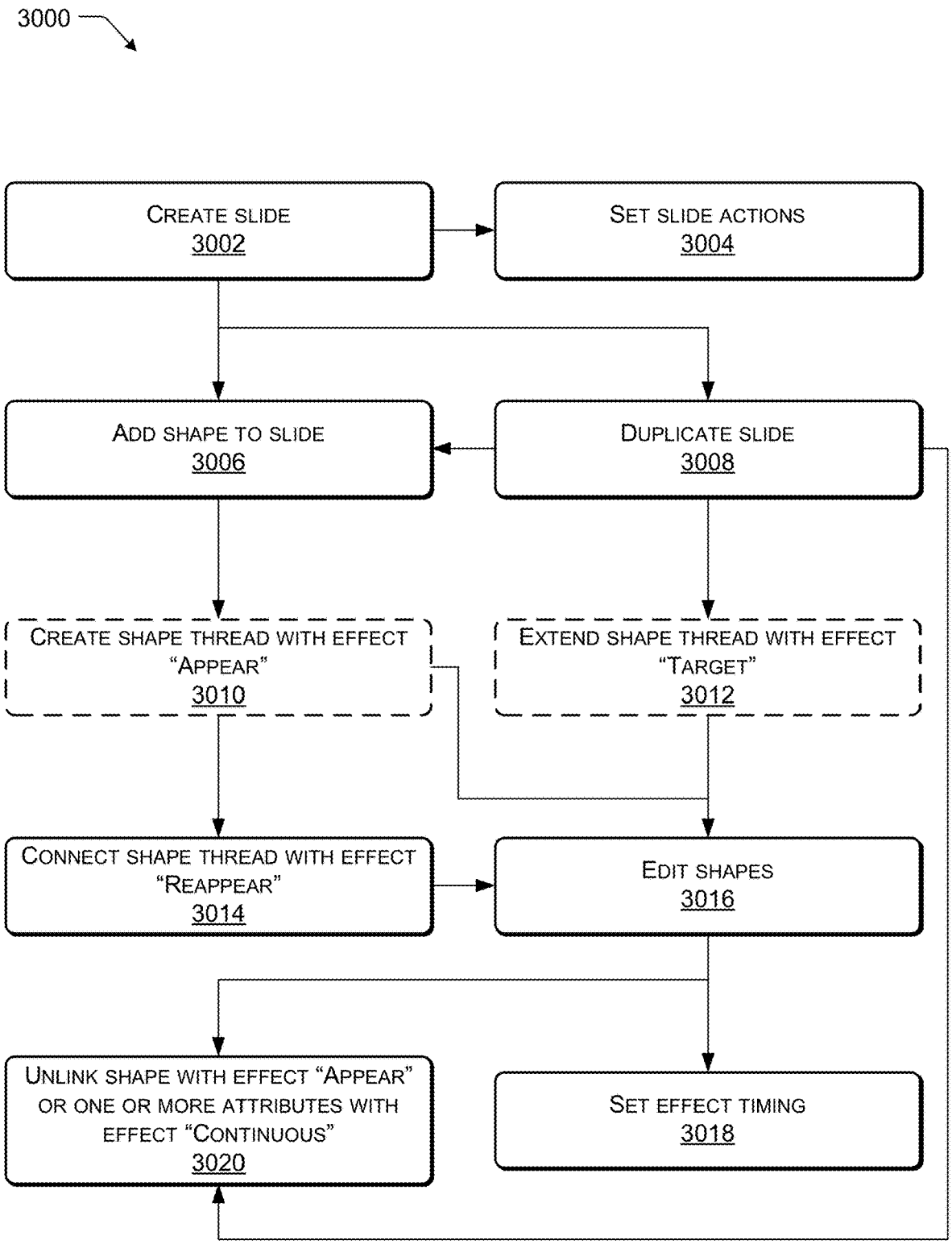
FIG. 30 illustrates an example process flow for creating and managing media effects, according to some implementations.
Figure 31:
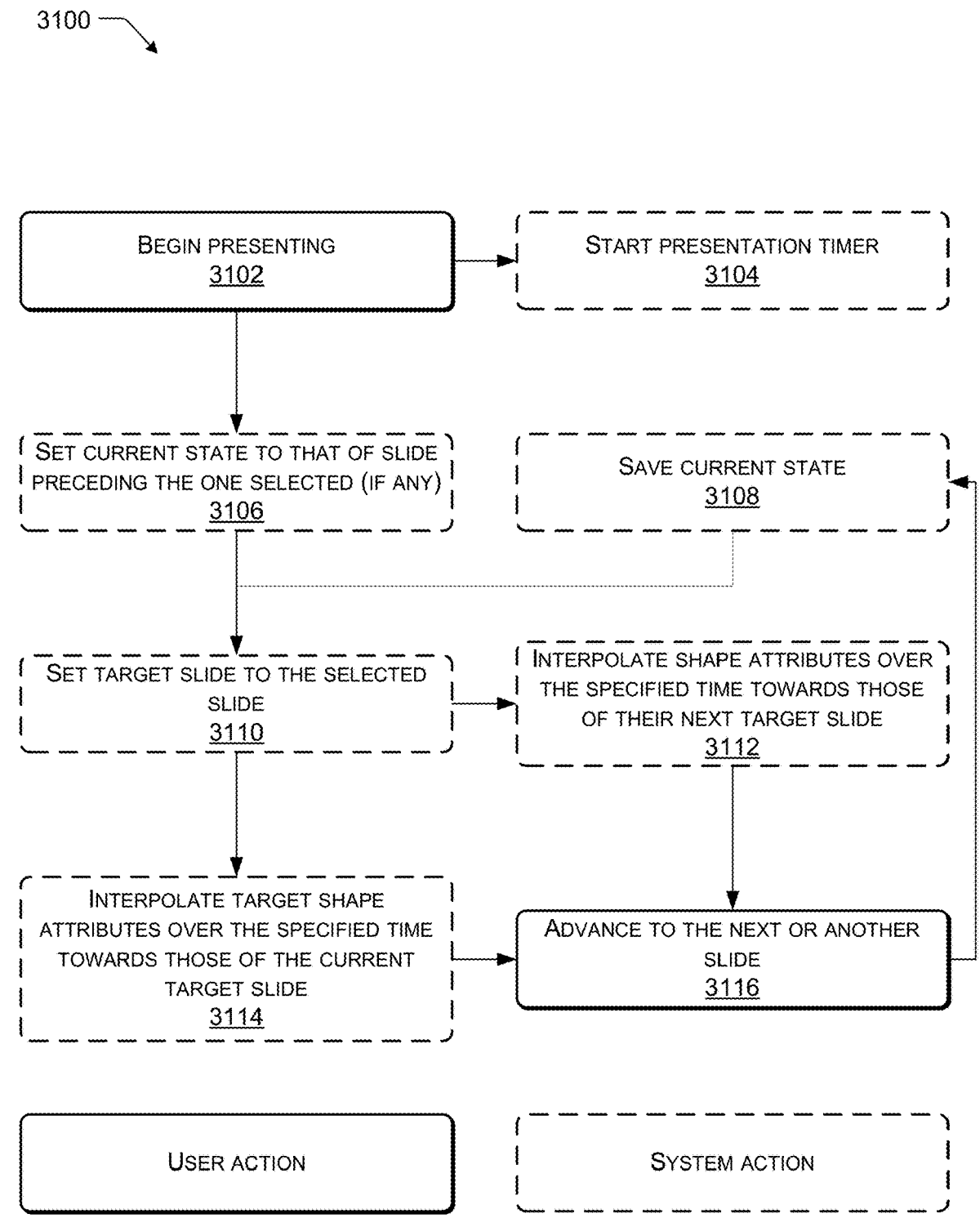
FIG. 31 illustrates an example process flow for presenting media effects, according to some implementations.

FIGS. 30 and 31 illustrate example process flows according to some implementations. In the flow diagrams of FIGS. 30 and 31, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. Numerous other variations will be apparent to those of skill in the art in light of the disclosure herein. For discussion purposes, the process flows in FIGS. 30 and 31 are described with reference to FIGS. 1-29, described above, although other models, frameworks, systems and environments may implement the illustrated process.

Referring to FIG. 30, at block 3002, the process flow 3000 includes creating a slide. For example, referring to FIG. 2, the user may create the first slide 108 via the user interface 100. As illustrated in FIG. 2, the first slide 108 may be displayed in the preview pane 102 and the detail view pane 104 of the user interface 100.

At block 3004, the process flow 3000 optionally includes setting slide actions. For example, referring to FIG. 2, the user may optionally manually identify a time period after which the presentation automatically advances to another slide.

At block 3006, the process flow 3000 includes adding a shape to the slide. For example, referring to FIGS. 2 and 3, the user may add the first shape 114 to the first slide 108. As illustrated in FIG. 3, after adding the first shape 114 to the first slide 108 in FIG. 2, the first shape 114 is displayed in the detail view pane 104, and a thumbnail image of the first shape 114 may be displayed in the preview pane 102. Further, FIG. 3 illustrates that the first shape thread 116 associated with the first shape 114 is added to the effects pane 106 for the first slide 108.

At block 3008, the process flow 3000 includes duplicating the slide. For example, referring to FIG. 4, the user may duplicate the first slide 108 to create the second slide 110. After duplicating the slide at block 3008, the process flow 3000 may return to block 3006, and a shape may be added to the duplicate slide. For example, referring to FIGS. 14 and 15, the second shape 118 may be added to the second slide 110 by dragging and dropping the second shape 118 from the first slide 108 displayed in the detail view pane 104 to the second slide 110 (e.g., the duplicate slide) displayed in the preview pane 102. As another example, referring to FIGS. 17 and 18, the third shape 122 may be added to the second slide 110 by dragging and dropping the third shape 122 from the first slide 108 displayed in the detail view pane 104 to the second slide 110 (e.g., the duplicate slide) displayed in the preview pane 102.

At block 3010, the process flow 3000 includes creating a shape thread with the "Appear" effect type. For example, referring to FIG. 3, the first shape thread 116 may be created in the effects pane 106 in response to the user adding the first shape 114 to the first slide 108. As another example, referring to FIGS. 10 and 11, the second shape thread 120 may be created in the effects pane 106 in response to the user adding the second shape 118 to the first slide 108. As a further example, referring to FIGS. 12 and 13, the third shape thread 124 may be created in the effects pane 106 in response to the user adding the third shape 122 to the first slide 108.

At block 3012, for the duplicate slide created at block 3008, the process flow 3000 includes extending a shape thread with the "Target" effect type. For example, referring to FIGS. 14 and 15, the second shape thread 120 associated with the second shape 118 may be extended to the second slide 110, and the second shape thread 120 may be displayed in the effects pane 106 for the second slide 110. As another example, referring to FIGS. 17 and 18, the third shape thread 124 associated with the third shape 122 may be extended to the second slide 110, and the third shape thread 124 may be displayed in the effects pane 106 for the second slide 110.

At block 3014, the process flow 3000 optionally includes connecting the shape thread with the "Reappear" effect type. While not illustrated in FIGS. 1-20, it will be appreciated that one or more of the shape threads 116, 120, 124 may be set to "Reappear" in a subsequent slide. As an illustrative example, if a fourth slide were to be added after the third slide 112, one or more of the shape threads 120 or 124 that were set to disappear upon transitioning from the second slide 110 to the third slide 112 may be set to reappear on the fourth slide.

At block 3016, the process flow 3000 includes editing one or more shapes (e.g., shapes on either the slide created at block 3002 or the duplicate slide created at block 3008). To illustrate, referring to FIGS. 6 and 7, the user may edit the first shape 114 on the third slide 112 to resize and reorient the first shape 114. As another example, referring to FIGS. 15 and 16, the user may edit the second shape 118 on the second slide 110 (e.g., to replace the text "Founded" with the text "Import Debut"). As a further example, referring to FIGS. 18 and 19, the user may edit the third shape 122 on the second slide 110 (e.g., to replace the year "1937" with the year "1955").

At block 3018, the process flow 3000 optionally includes setting the effect timing (e.g., from a default timing value). For example, referring to FIG. 11, the user may change the default timing for the appearance of the second shape 118 on the first slide 108 from one second to three seconds. As another example, referring to FIG. 13, the user may change the default timing for the appearance of the third shape 122 on the first slide 108 from one second to two seconds. FIGS. 21-23 illustrate that this change of appearance timing results in the first shape 114 being the first shape to appear on the first slide 108, the third shape 122 appearing next (e.g., after two seconds), and the second shape 118 appearing next (e.g., after three seconds).

As another example, the user may change the effect timing for the duplicate slide created at block 2008 (e.g., the second slide 110). For example, referring to FIG. 16, the user may change the default timing for the transition of the second shape 118 from one second to two seconds. As another example, referring to FIG. 19, the user may change the default timing for the transition of the third shape 122 from one second to three seconds. FIGS. 24-26 illustrate that this change of appearance timing results in the second shape 118 transitioning from the first slide 108 to the second slide 110 over a time period of two seconds, and the third shape 122 transitioning to the second slide 110 over a time period of three seconds).

At block 3020, the process flow 3000 includes unlinking shapes with the effect type "Appear" or one or more attributes with the effect type "Continuous." For example, referring to FIG. 9, the user may change the effect type of the first shape 114 on the second slide 110 to "Continuous."

Referring to FIG. 31, at block 3102, the process flow 3100 includes beginning a presentation. For example, referring to FIG. 20, the user may begin the presentation by clicking the Run icon 132, while FIG. 21 illustrates the first slide 108 of the presentation being displayed in response.

At block 3104, the process flow 3100 includes starting a presentation timer. At block 3106, the process flow 3100 optionally includes setting a current state to that of the slide preceding the selected slide. At block 3108, the process flow 3100 includes saving the current state. At block 3110, the process flow 3100 includes setting the target slide to the selected slide. At block 3112, the process flow 3100 includes interpolating shape attributes over the specified time towards those of their next target slide.

To illustrate, referring to FIG. 8, the user may specify that the first shape 114 is set to reach its target state as defined on the third slide 112 after one minute. As illustrated in FIGS. 21-29, the size and position of the first shape 114 may be interpolated from the initial size and position on the first slide 108 to the target size and position on the third slide 112 over the time period of one minute specified by the user.

At block 3116, the process flow 3100 includes advancing to the next or another slide. For example, referring to FIGS. 23 and 24, the user may click or otherwise select to advance from the first slide 108 to the second slide 110. In response, the first slide 108 transitions to the second slide 110 as illustrated in FIGS. 24-26 in accordance with the parameters specified by the user in the user interface 100. As another example, referring to FIGS. 27 and 28, the user may click or otherwise select to advance from the second slide 110 to the third slide 112. FIGS. 28 and 29 illustrate a particular example of the second slide 110 transitioning to the third slide 112.

The process flows 3000 and 3100 illustrated in FIGS. 30 and 31 are merely example process flows. In other examples, the operations/blocks may be rearranged, combined, modified, or omitted without departing from the disclosure.

Example Computing Device and Environment

Figure 32:
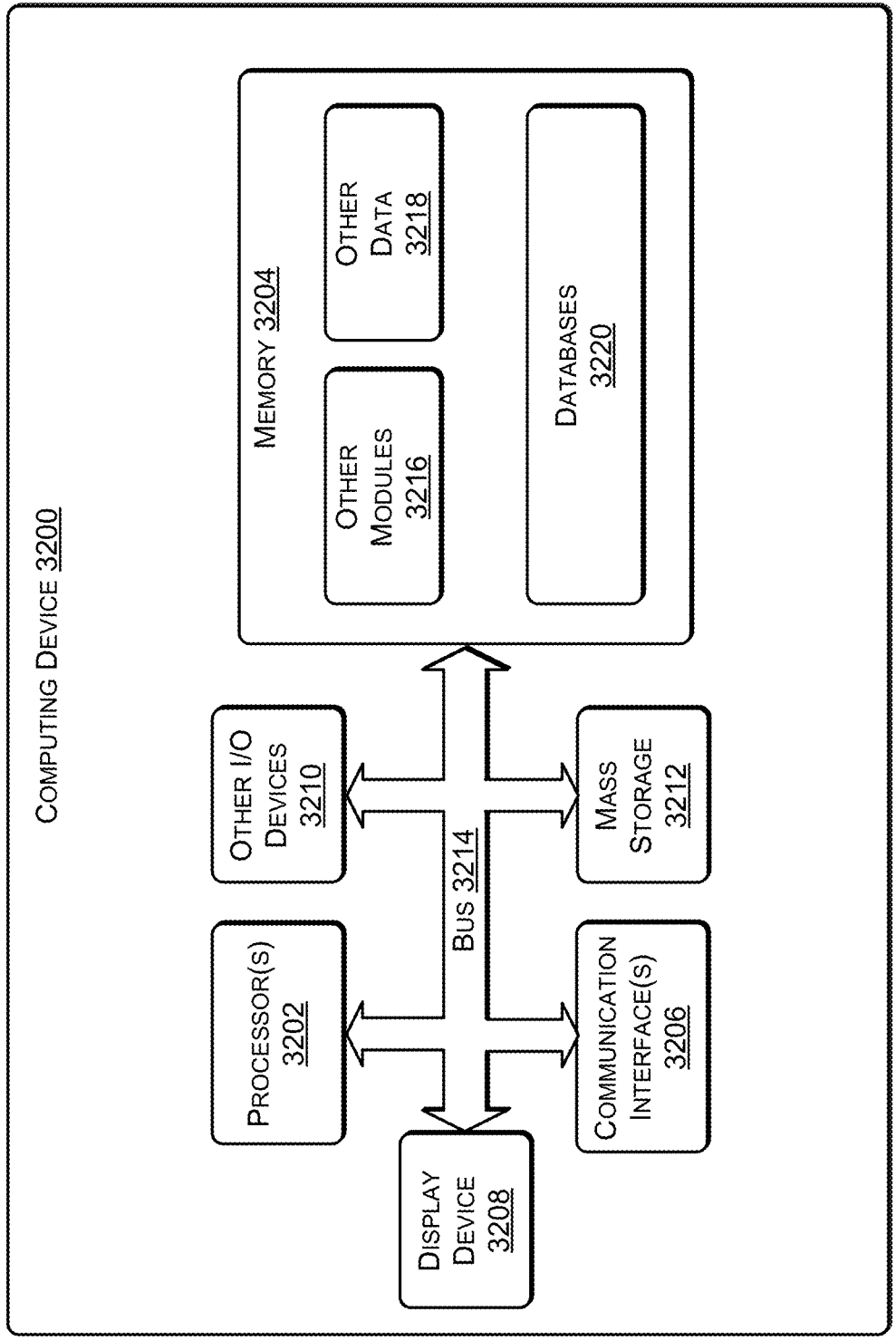
FIG. 32 illustrates an example system in which some implementations may operate.

FIG. 32 illustrates an example configuration of a computing device 3200 and an environment that can be used to implement the modules and functions described herein. It should be understood that the computing device 3200 may be configured in a similar manner to that illustrated.

The computing device 3200 may include at least one processor 3202, a memory 3204, communication interfaces 3206, a display device 3208 (e.g. a touchscreen display), other input/output (I/O) devices 3210 (e.g. a touchscreen display or a mouse and keyboard), and one or more mass storage devices 3212, able to communicate with each other, such as via a system bus 3214 or other suitable connection.

The processor 3202 may be a single processing unit or a number of processing units, all of which may include single or multiple computing units or multiple cores. The processor 3202 can be implemented as one or more microprocessors, microcomputers, microcontrollers, digital signal processors, central processing units, state machines, logic circuitries, and/or any devices that manipulate signals based on operational instructions. Among other capabilities, the processor 3202 can be configured to fetch and execute computer-readable instructions stored in the memory 3204, mass storage devices 3212, or other computer-readable media.

Memory 3204 and mass storage devices 3212 are examples of computer storage media for storing instructions which are executed by the processor 3202 to perform the various functions described above. For example, memory 3204 may generally include both volatile memory and non-volatile memory (e.g., RAM, ROM, or the like). Further, mass storage devices 3212 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 3204 and mass storage devices 3212 may be collectively referred to as memory or computer storage media herein, and may be computer-readable media capable of storing computer-readable, processor-executable program instructions as computer program code that can be executed by the processor 3202 as a particular machine configured for carrying out the operations and functions described in the implementations herein.

The computing device 3200 may also include one or more communication interfaces 3206 for exchanging data with other devices, such as via a network, direct connection, or the like, as discussed above. The communication interfaces 3206 can facilitate communications within a wide variety of networks and protocol types, including wired networks (e.g., LAN, cable, etc.) and wireless networks (e.g., WLAN, cellular, satellite, etc.), the Internet and the like. Communication interfaces 3206 can also provide communication with external storage (not shown), such as in a storage array, network attached storage, storage area network, or the like.

The discussion herein refers to data being sent and received by particular components or modules. This should not be taken as a limitation as such communication need not be direct and the particular components or module need not necessarily be a single functional unit. This is not to be taken as limiting implementations to only those in which the components directly send and receive data from one another. The signals could instead be relayed by a separate component upon receipt of the data. Further, the components may be combined or the functionality may be separated amongst components in various manners not limited to those discussed above. Other variations in the logical and practical structure and framework of various implementations would be apparent to one of ordinary skill in the art in view of the disclosure provided herein.

A display device 3208, such as touchscreen display or other display device, may be included in some implementations. The display device 3208 may be configured to display the user interface 100 as described above. Other I/O devices 3210 may be devices that receive various inputs from a user and provide various outputs to the user, and may include a touchscreen, such as a touchscreen display, a keyboard, a remote controller, a mouse, a printer, audio input/output devices, and so forth.

Memory 3204 may include modules and components for execution by the computing device 3200 according to the implementations discussed herein. Memory 3204 may further include one or more other modules 3216, such as an operating system, drivers, application software, communication software, or the like. Memory 3204 may also include other data 3218, such as data stored while performing the functions described above and data used by the other modules 3216. Memory 3204 may also include other data and data structures described or alluded to herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

As used herein, "computer-readable media" includes computer storage media and communication media. Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method for generating a shape thread for a shape in multiple slides of a presentation, comprising:
    displaying, at a computing device, a user interface comprising an effects pane and a first slide of the presentation, wherein the effects pane comprises a display of the shape thread comprising a first transition attribute for displaying the shape on the first slide of the presentation;
    receiving a user indication to generate a duplicate slide of the first slide;
    generating, based on the user indication, a second slide based on the first slide, wherein the second slide comprises the shape and is associated with the shape thread, the shape thread comprising:
        the first transition attribute for displaying the shape on the first slide; and
        a second transition attribute for displaying the shape on the second slide; and
    displaying an updated user interface comprising the second slide and the effects pane, wherein the effects pane comprises a display of the shape thread comprising the second transition attribute for the shape on the second slide of the presentation.

2. The method as recited in claim 1, wherein:
    the first transition attribute comprises an amount of time for the shape to transition in response to navigation between slides; and the amount of time for the shape on the first slide to transition is different from an amount of time for another shape on the first slide to transition.

3. The method as recited in claim 2, wherein the amount of time for the shape to transition comprises an amount of time for the shape to appear in response to navigation to the second slide from another slide of the presentation.

4. The method as recited in claim 3, wherein the amount of time for the shape to appear is different from an amount of time for another shape to appear on the second slide.

5. The method as recited in claim 2, wherein the amount of time for the shape to transition comprises an amount of time for the shape to disappear in response to navigation from the first slide to another slide of the presentation.

6. The method as recited in claim 2, wherein the amount of time for the shape to appear comprises a delay period that is different from a delay period for another shape to appear in response to navigation from the first slide to another slide of the presentation.

7. The method as recited in claim 1, wherein at least one of the first transition attribute and the second transition attribute comprises a semantic attribute.

8. The method as recited in claim 7, wherein the semantic attribute comprises at least one of a date attribute, a time attribute, a typesetting attribute, a text attribute, or a combination thereof.

9. The method as recited in claim 7, wherein the semantic attribute comprises at least one of:
an amount of time to perform a linear interpolation from a first semantic value of the shape on the first slide to a second semantic value of the shape on the second slide; or
an amount of time to perform a non-linear interpolation from a first semantic value of shape on the first slide to a second semantic value of the shape on the second slide.

10. The method as recited in claim 1, wherein one or more slide transition attributes are independently adjustable via the display of the shape thread.

11. A system comprising:
at least one processor; and
memory storing instructions that, when executed by the at least one processor, causes the system to perform a set of operations, the set of operations comprising:
displaying, at a computing device, a user interface comprising an effects pane and a first slide of a presentation, wherein the effects pane comprises a display of a shape thread comprising a first transition attribute for displaying a shape on the first slide of the presentation;
receiving a user indication to generate a duplicate slide of the first slide;
generating, based on the user indication, a second slide based on the first slide, wherein the second slide comprises the shape and is associated with the shape thread, the shape thread comprising:
the first transition attribute for displaying the shape on the first slide; and
a second transition attribute for displaying the shape on the second slide; and
displaying an updated user interface comprising the second slide and the effects pane, wherein the effects pane comprises a display of the shape thread comprising the second transition attribute for the shape on the second slide of the presentation.

12. The system of claim 1, wherein the first transition attribute comprises an amount of time for the shape to transition in response to navigation between slides, and wherein the amount of time for the shape to transition is different from an amount of time for another shape in response to navigation between slides.

13. The system of claim 12, wherein the amount of time for the shape to transition comprises at least one of:
an amount of time for the shape to appear; and
an amount of time for the shape to disappear.

14. The system of claim 1, wherein at least one of the first transition attribute and the second transition attribute includes a sematic attribute.

15. The system of claim 14, wherein the semantic attribute comprises at least one of a date attribute, a time attribute, a typesetting attribute, a text attribute, or a combination thereof.

16. A system comprising:
at least one processor; and
memory storing instructions that, when executed by the at least one processor, causes the system to perform a set of operations, the set of operations comprising:
displaying, at a computing device, a user interface comprising an effects pane and a first slide of a presentation, wherein the effects pane comprises a display of a shape thread comprising a first transition attribute for displaying a shape on the first slide of the presentation;
generating a second slide based on the first slide, wherein the second slide comprises the shape and is associated with the shape thread, the shape thread comprising:
the first transition attribute for displaying the shape on the first slide; and
a second transition attribute for displaying the shape on the second slide; and
displaying an updated user interface comprising the second slide and the effects pane, wherein the effects pane comprises a display of the shape thread comprising the second transition attribute for the shape on the second slide of the presentation.

17. The system of claim 16, wherein at least one of the first transition attribute and the second transition attribute comprises a sematic attribute.

18. The system of claim 17, wherein the semantic attribute comprises at least one of a date attribute, a time attribute, a typesetting attribute, a text attribute, or a combination thereof.

19. The system of claim 16, wherein the updated user interface is useable to adjust the first slide transition attribute and the second slide transition attribute of the shape thread.

20. The system of claim 16, wherein the first transition attribute comprises a first amount of time for the shape to transition in response to navigating to the first slide and the second transition attribute comprises a second amount of time for the shape to transition in response to navigating to the second slide, and wherein the first amount of time is different from the second amount of time.

* * * * *